United States Patent
Maruo

(10) Patent No.: US 6,259,809 B1
(45) Date of Patent: Jul. 10, 2001

(54) SYSTEM AND METHOD FOR RECOGNITION OF IMAGE INFORMATION

(75) Inventor: Kazuyuki Maruo, Sendai (JP)

(73) Assignee: Advantest Corporation, Tokyo (JP)

( * ) Notice: Subject to any disclaimer, the term of this patent is extended or adjusted under 35 U.S.C. 154(b) by 0 days.

(21) Appl. No.: 09/144,225

(22) Filed: Aug. 31, 1998

(30) Foreign Application Priority Data

Aug. 29, 1997 (JP) .................................................. 9-234264

(51) Int. Cl.⁷ ...................................................... G06K 9/00
(52) U.S. Cl. .................... 382/151; 382/147; 382/172; 382/199; 382/281
(58) Field of Search .................................. 382/145, 147, 382/151, 172, 201, 266, 281, 199

(56) References Cited

U.S. PATENT DOCUMENTS

| | | | |
|---|---|---|---|
| 4,731,860 | * 3/1988 | Wahl | 382/43 |
| 5,063,604 | * 11/1991 | Weiman | 382/41 |
| 5,247,587 | * 9/1993 | Hasegawa et al. | 358/105 |
| 5,430,810 | * 7/1995 | Saeki | 382/199 |
| 5,629,989 | * 5/1997 | Osada | 382/193 |
| 5,974,521 | * 10/1999 | Akerib | 395/309 |

\* cited by examiner

*Primary Examiner*—Matthew C. Bella
*Assistant Examiner*—Sheela Chawan
(74) *Attorney, Agent, or Firm*—Gallagher & Lathrop; David N. Lathrop

(57) ABSTRACT

An image information recognition system is provided which quantifies an angle of rotation and/or magnification of a wiring pattern in an image to facilitate a subsequent image retrieval. The system comprises edge detecting means which detects an edge component from input digital image data, a first binarization processor means for applying a threshold operation to the image obtained to provide binarization image data comprising active and inactive picture elements, Hough transformation means for applying a Hough transformation to the binarization image, second binarization processor means for applying a threshold operation to the Hough transformed image to provide binarization image data comprising active and inactive picture elements, labeling processor means for collecting adjacent images in the binarization image into a group and labeling the group, representative point calculation means for determining the coordinates a of representative point for each group labeled, and linear component estimation means for determining a linear equation for a rectilinear portion of the edge component in the original image from coordinate information of respective representative points determined.

16 Claims, 13 Drawing Sheets

SYSTEM AND METHOD FOR RECOGNITION OF IMAGE INFORMATION

BACKGROUND OF THE INVENTION

1. Field of the Invention

The present invention relates to a system for and a method of recognizing a feature contained in an image or picture such as, for example, a pattern image on the surface of a semiconductor wafer, a printed wiring pattern or printed circuit pattern of a printed board, or the like, and more particularly, to such image information recognition system and method suitable for use in recognizing linear information on a digital image or picture.

2. Description of the Related Art

There have been previously known in the art many image processing methods and systems which perform an inspection, recognition, judgment or diagnosis of an object or article using an image or picture thereof. Almost all of the processing methods and systems utilize a digital image processing in which an image is digitally treated or processed and they perform the image processing using a computer.

For example, the occurrence of a defect or defects or a commingled foreign substance or substances during the manufacture of a printed board or a semiconductor wafer comes to the cause of a faulty or defective product. Herein, the term "printed board" is intended to refer generically to a single-sided, a double-sided and a multi-layer printed boards inclusive of flexible printed circuits. It is thus necessary that the occurrence of any defect inclusive of a foreign substance is rapidly detected. In the conventional practice, if a defect occurs on a printed board or a wafer surface, the defect is observed by use of, for example, a scanning electron microscope (SEM), and the result of observation (an image of the printed board or wafer surface obtained by taking it) is stored as image data.

A multiplicity of image information recognition methods and systems have been also proposed in the art for detecting, recognizing or rendering a decision about the presence of a defect and/or an alien substance as mentioned above on the basis of a photograph of a printed board, or an image or picture of a semiconductor wafer obtained by having taken it using the scanning electron microscope or the like and supplied thereto.

It is noted that there exist a number of images having a very similar structure among the stored defective images thus obtained. It happens that during the observation of a wafer image, one may want to see a past image which exhibited a similar structure. However, at present, he can find no other alternative but to retrieve image files one after another relying on his memory. In addition, since features appearing on the image data do not be readily expressible by words, frequently he cannot find the exact past image of similar structure. That is, the exact past image can be easily found only by one who has actually observed this past image. Thus, it is not a simple matter to share such image data with others. To resolve such problem, there is an increasing need for a system which enables an efficient retrieval of image data of printed boards and/or semiconductor wafers.

Conventionally, a retrieval of image data is performed principally by utilizing a pattern matching technique which compares an image to be detected with the stock of images. The comparison between two images means a processing in which values of picture elements of the one image are taken from values of picture elements of the other image for their corresponding picture elements to create a difference image with respect to picture element values between the two images. When such a difference image is created, if the two images being compared are all the same, the resulting difference image will be a flat image having its all picture element values of 0 throughout the entire image. However, if defects or foreign matters of the two images are different in shape from each other, picture elements having values other than 0 appear concentratedly in the region that the shapes are different. In this instance, the total number of picture elements which have values other than 0 or the like is measured and the measured value is compared with a preset threshold, and if the measured value is less than the threshold, a decision is rendered that the two images are similar and the decision is outputted as a result of retrieval.

In this manner, only similar images can be extracted from the stored image data.

In case image data is an image of a semiconductor wafer or a printed board, the background of the image includes a printed wiring pattern which runs vertically and horizontally or obliquely. The wiring pattern is normally aligned in a given direction in regular manner, and accordingly, the use of the pattern matching technique with the wiring pattern results in canceling out the background of the image. As a result, only differences in unique areas (features) of the two images such as defects and/or foreign substances can be extracted.

Where it is desired to detect linear components regularly aligned such as components of the wiring pattern in the image data, the pattern matching technique mentioned above can be simplified and performed at high speed in the following manner.

Initially, an edge detection procedure is applied to an original image to create a binarization image of binary values comprising only edge components. Edge components of linear components (the wiring pattern) in the original image remain among the created binarization image. As a template for the binarization image is prepared a binarization image which depicted a single straight line for every inclination and every intercept. The mathematical product is taken between the template and a binarization image to be detected, and the number of active picture elements in the product image is counted. When a linear component which is identical with the linear component depicted in the template exists in the binarization image to be detected, the active picture elements in the template overly those in the binarization image to be detected, whereby the number of active picture elements in the product image increases. If the count exceeds a predetermined threshold, a decision is rendered that the linear component depicted in the template does exist in the original image.

In this manner, the presence of any linear component in the original image can be detected.

While the described defect detecting technique is already established, it suffers from a disadvantage in that the comparison of the two images by using the pattern matching technique requires a register or matching of corresponding locations of two images such as wiring patterns on the two images. The register of corresponding locations must be done accurately and such work requires a considerable labors.

The stored image data which is to be retrieved has been reserved in the state that an image was rotated at a predetermined angle and/or enlarged (scaled up) or reduced (scaled down) in order to allow an observer to analyze detailed features of defects. Accordingly, the orientation and/or size of the wiring pattern often varies from image to image, and this adds a further difficulty to the registering operation.

In such way, if a modification such as rotation, magnification or minification should be applied to the same image or picture, even the retrieval of the same image using the pattern matching technique becomes very difficult.

It will then be seen that when an angle of rotation as well as a magnification/minification of each wiring pattern in the images of semiconductor wafers and/or printed boards which are stored as a stock in a database are quantified and if the background of individual images can be matched to each other by using the quantified values, or in other words, if a normalization of images can be achieved, a subsequent registering of a pair of images can be dispensed with, and an image retrieval is enabled in a facilitated manner by a simple technique such as the pattern matching technique, for example.

Further, in case that the linear components in a binarization image comprising only edge components are detected using the pattern matching technique as described above, a quantification of an angle of rotation as well as a magnification/minification of the linear component is also possible. However, in this case, there remains a disadvantage that the rate of successful retrieval may be degraded if there is any slight displacement or curvature in the linear components in the original image.

SUMMARY OF THE INVENTION

It is an object of the present invention to provide an image information recognition system which quantifies an angle of rotation as well as a magnification/minification of a linear component in an image by utilizing the Hough transformation to facilitate a subsequent image retrieval.

It is another object of the present invention to provide an image information recognition method which enables a quantification of an angle of rotation as well as a magnification/minification of a linear component in an image by utilizing the Hough transformation.

In order to accomplish the above objects, in a first aspect of the present invention, there is provided an image information recognition system for inspecting, recognizing or judging an object using an image thereof, comprising: edge detecting means for detecting an edge component from input digital image data; first binarization processor means for processing an image obtained by the edge detecting means by use of a threshold to provide binarization image data comprising active picture elements and inactive picture elements; Hough transformation means for applying a Hough transformation to the binarization image obtained by the first binarization processor means; second binarization processor means for processing the Hough transformed image from the Hough transformation means by use of a threshold to provide binarization image data comprising active picture elements and inactive picture elements; labeling processor means for grouping adjacent picture elements in the binarization image obtained by the second binarization processor means together; representative point calculation means for determining the coordinates of a representative point of each of a plurality of labels grouped by the labeling processor means; and linear component estimation means for determining a linear equation for a rectilinear portion in the is edge component in the original image from the coordinate information of respective representative points found by the representative point calculation means.

In a second aspect of the present invention, there is provided an image information recognition system for inspecting, recognizing or judging an object using an image thereof, comprising: mean value calculation means for calculating a mean value M of all picture element values from input digital image data and for subtracting the mean value M from the picture element value of each of the picture elements in the original image data to produce a difference image data; first binarization processor means for processing the difference image data obtained by the mean value calculation means by use of a threshold to provide binarization image data comprising active picture elements and inactive picture elements; Hough transformation means for applying a Hough transformation to the binarization image obtained by the first binarization processor means; second binarization processor means for processing the Hough transformed image from the Hough transformation means by use of a threshold to provide binarization image data comprising active picture elements and inactive picture elements; labeling processor means for grouping adjacent picture elements in the binarization image obtained by the second binarization processor means together; representative point calculation means for determining the coordinates of a representative point of each of a plurality of labels grouped by the labeling processor means; and linear component estimation means for determining a linear equation for a rectilinear portion in the edge component in the original image from the coordinate information of respective representative points found by the representative point calculation means.

In a third aspect of the present invention, there is provided an image information recognition system for inspecting, recognizing or judging an object using an image thereof, comprising: mean value calculation means for calculating a mean value M of all picture element values from input digital image data; modified Hough transformation means for applying a Hough transformation $$\rho = x \cos \theta + y \sin \theta$$

to each picture element (its coordinates (x, y)) of the original image and for effecting a polling in the $\theta-\rho$ parameter space with a weight equal to the difference $|t(x, y)-M|$ between the picture element value t and the mean value M calculated by the mean value calculation means; binarization processor means for processing the modified Hough transformed image from the modified Hough transformation means by use of a threshold to provide binarization image data comprising active picture elements and inactive picture elements; labeling processor means for grouping adjacent picture elements in the binarization image obtained by the second binarization processor means together; representative point calculation means for determining the coordinates of a representative point of each of a plurality of labels grouped by the labeling processor means; and linear component estimation means for determining a linear equation for a rectilinear portion in the edge component in the original image from the coordinate information of respective representative points found by the representative point calculation means.

In a fourth aspect of the present invention, there is provided an image information recognition system for inspecting, recognizing or judging an object using an image thereof, comprising: edge detecting means for detecting an edge component from input digital image data; first binarization processor means for processing an image obtained by the edge detecting means by use of a threshold to provide binarization image data comprising active picture elements and inactive picture elements; Hough transformation means for applying a Hough transformation to the binarization image obtained by the first binarization processor means; second binarization processor means for processing the Hough transformed image from the Hough transformation means by use of a threshold to provide binarization image data comprising active picture elements and inactive picture elements; labeling processor means for grouping adjacent picture elements in the binarization image obtained by the second binarization processor means together; representative point calculation means for determining the coordinates of a representative point of each of a plurality of labels grouped by the labeling processor means; linear component estimation means for determining a linear equation for a rectilinear portion in the edge component in the original image from the coordinate information of respective representative points found by the representative point calculation means; spacing calculation means operative when there are a plurality of rectilinear portions oriented in the same direction as determined by the linear component estimation means to calculate a spacing between adjacent rectilinear portions from information representing intercepts of the plurality of rectilinear portions; and minimum value calculation means for determining the minimum spacing among the spacings calculated by the spacing calculation means and for outputting it as representative of the width of an object to be recognized in the original image.

In a fifth aspect of the present invention, there is provided an image information recognition system for inspecting, recognizing or judging an object using an image thereof, comprising: mean value calculation means for calculating a mean value M of all picture element values from input digital image data and for subtracting the mean value M from the picture element value of each of the picture elements in the original image data to produce a difference image data; first binarization processor means for processing the difference image data obtained by the mean value calculation means by use of a threshold to provide binarization image data comprising active picture elements and inactive picture elements; Hough transformation means for applying a Hough transformation to the binarization image obtained by the first binarization processor means; second binarization processor means for processing the Hough transformed image from the Hough transformation means by use of a threshold to provide binarization image data comprising active picture elements and inactive picture elements; labeling processor means for grouping adjacent picture elements in the binarization image obtained by the second binarization processor means together; representative point calculation means for determining the coordinates of a representative point of each of a plurality of labels grouped by the labeling processor means; linear component estimation means for determining a linear equation for a rectilinear portion in the edge component in the original image from the coordinate information of respective representative points found by the representative point calculation means; spacing calculation means operative when there are a plurality of rectilinear portions oriented in the same direction as determined by the linear component estimation means to calculate a spacing between adjacent rectilinear portions from information representing intercepts of the plurality of rectilinear portions; and minimum value calculation means for determining the minimum spacing among the spacings calculated by the spacing calculation means and for outputting it as representative of the width of an object to be recognized in the original image.

In a sixth aspect of the present invention, there is provided an image information recognition system for inspecting, recognizing or judging an object using an image thereof, comprising: mean value calculation means for calculating a mean value M of all picture element values from input digital image data; modified Hough transformation means for applying a Hough transformation $$\rho = x \cos \theta + y \sin \theta$$

to each picture element (its coordinates (x, y)) of the original image and for effecting a polling in the $\theta$–$\rho$ parameter space with a weight equal to the difference $|t(x, y)-M|$ between the picture element value t and the mean value M calculated by the mean value calculation means; binarization processor means for processing the modified Hough transformed image from the modified Hough transformation means by use of a threshold to provide binarization image data comprising active picture elements and inactive picture elements; labeling processor means for grouping adjacent picture elements in the binarization image obtained by the second binarization processor means together; representative point calculation means for determining the coordinates of a representative point of each of a plurality of labels grouped by the labeling processor means; linear component estimation means for determining a linear equation for a rectilinear portion in the edge component in the original image from the coordinate information of respective representative points found by the representative point calculation means; spacing calculation means operative when there are a plurality of rectilinear portions oriented in the same direction as determined by the linear component estimation means to calculate a spacing between adjacent rectilinear portions from information representing intercepts of the plurality of rectilinear portions; and minimum value calculation means for determining the minimum spacing among the spacings calculated by the spacing calculation means and for outputting it as representative of the width of an object to be recognized in the original image.

The minimum value calculation means may be replaced by equal spacing decision means which is operative, when there are a plurality of rectilinear portions having an equal inclination, to compare the minimum spacing with the remaining spacings, and in the event it is found that the same spacing prevail at a plurality of occurrences, outputs such spacing as representing the equal spacing width for all rectilinear portions over the entire image.

Alternatively, the equal spacing decision means which replaces the minimum value calculation means may operate, when there are a plurality of rectilinear portions having the same inclination, to compare the minimum spacing with the remaining spacings, and if the occurrence of the same spacing more than once is not found, the next smallest spacing may be determined and such procedure may be repeated until the occurrence of the same spacing more than one is found. When the occurrence of the same spacing more than once is found, this spacing is outputted as the equal spacing width between all rectilinear portions over the entire image. In the event the occurrence of the same spacing more than once is not found ultimately, the initial minimum spacing is outputted as representing the width of the object to be recognized.

In a seventh aspect of the present invention, there is provided an image information recognition method for inspecting, recognizing or judging an object using an image thereof, comprising the steps of: detecting an edge component from input digital image data; applying a first threshold operation to the image obtained by the detection of the edge component to provide a binarization image data comprising active picture elements and inactive picture elements; applying a Hough transformation to the binarization image obtained as a result of the first threshold operation; applying a second threshold operation to the Hough transformed image to provide binarization image data comprising active picture elements and inactive picture elements; grouping adjacent picture elements in the binarization image obtained by the second threshold operation together; determining the coordinates of a representative point of each of a plurality of labels each of which has been grouped; and determining a linear equation for a rectilinear portion of the edge component in the original image from coordinate information of respective representative points found.

In a eighth aspect of the present invention, there is provided an image information recognition method for inspecting, recognizing or judging an object using an image thereof, comprising the steps of: calculating a mean value M of all picture element values from input digital image data, and subtracting the mean value M from the picture element value of each of the picture elements in the original image data to produce a difference image data; applying a first threshold operation to the difference image data to provide binarization image data comprising active picture elements and inactive picture elements; applying a Hough transformation to the binarization image obtained by the first threshold operation; applying a second threshold operation to the Hough transformed image to provide binarization image data comprising active picture elements and inactive picture elements; grouping adjacent picture elements in the binarization image obtained by the second threshold operation together; determining the coordinates of a representative point of each of a plurality of labels each of which has been grouped; and determining a linear equation for a rectilinear portion of the edge component in the original image from coordinate information of respective representative points found.

In a ninth aspect of the present invention, there is provided an image information recognition method for inspecting, recognizing or judging an object using an image thereof, comprising the steps of: calculating a mean value M of all picture element values from input digital image data; applying a Hough transformation $$\rho = x \cos \theta + y \sin \theta$$

to each picture element (its coordinates (x, y)) of the original image and effecting a polling in the $\theta$–$\rho$ parameter space with a weight equal to the difference $|t(x, y)-M|$ between the picture element value t and the calculated mean value M; applying a threshold operation to the image obtained by the polling to provide binarization image data comprising active picture elements and inactive picture elements; grouping adjacent picture elements in the binarization image obtained by the second threshold operation together; determining the coordinates of a representative point of each of a plurality of labels each of which has been grouped; and determining a linear equation for a rectilinear portion of the edge component in the original image from coordinate information of respective representative points found.

In a tenth aspect of the present invention, there is provided an image information recognition method for inspecting, recognizing or judging an object using an image thereof, comprising the steps of: detecting an edge component from input digital image data; applying a first threshold operation to the image obtained by the detection of the edge component to provide a binarization image data comprising active picture elements and inactive picture elements; applying a Hough transformation to the binarization image obtained as a result of the first threshold operation; applying a second threshold operation to the Hough transformed image to provide binarization image data comprising active picture elements and inactive picture elements; grouping adjacent picture elements in the binarization image obtained by the second threshold operation together; determining the coordinates of a representative point of each of a plurality of labels each of which has been grouped; determining a linear equation for a rectilinear portion of the edge component in the original image from coordinate information of respective representative points found; in the event there are a plurality of rectilinear portions oriented in the same direction, calculating a spacing between adjacent rectilinear portions from information representing intercepts of the plurality of rectilinear portions; and determining the minimum spacing among the calculated spacings and determining it as representative of the width of the object to be recognized in the original image.

In a eleventh aspect of the present invention, there is provided an image information recognition method for inspecting, recognizing or judging an object using an image thereof, comprising the steps of: calculating a mean value M of all picture element values from input digital image data, and subtracting the mean value M from the picture element value of each of the picture elements in the original image data to produce a difference image data; applying a first threshold operation to the difference image data to provide binarization image data comprising active picture elements and inactive picture elements; applying a Hough transformation to the binarization image obtained by the first threshold operation; applying a second threshold operation to the Hough transformed image to provide binarization image data comprising active picture elements and inactive picture elements; grouping adjacent picture elements in the binarization image obtained by the second threshold operation together; determining the coordinates of a representative point of each of a plurality of labels each of which has been grouped; determining a linear equation for a rectilinear portion of the edge component in the original image from coordinate information of respective representative points found; in the event there are a plurality of rectilinear portions oriented in the same direction, calculating a spacing between adjacent rectilinear portions from information representing intercepts of the plurality of rectilinear portions; and determining the minimum spacing among the calculated spacings and determining it as representative of the width of the object to be recognized in the original image.

In a twelfth aspect of the present invention, there is provided an image information recognition method for inspecting, recognizing or judging an object using an image thereof, comprising the steps of: calculating a mean value M of all picture element values from input digital image data; applying a Hough transformation $$\rho = x \cos \theta + y \sin \theta$$

to each picture element (its coordinates (x, y)) of the original image and effecting a polling in the $\theta$–$\rho$ parameter space with a weight equal to the difference $|t(x, y)-M|$ between the picture element value t and the calculated mean value M; applying a threshold operation to the image obtained by the polling to provide binarization image data comprising active picture elements and inactive picture elements; grouping adjacent picture elements in the binarization image obtained by the second threshold operation together; determining the coordinates of a representative point of each of a plurality of labels each of which has been grouped; determining a linear equation for a rectilinear portion of the edge component in the original image from coordinate information of respective representative points found; in the event there are a plurality of rectilinear portions oriented in the same direction, calculating a spacing between adjacent rectilinear portions from information representing intercepts of the plurality of rectilinear portions; and determining the minimum spacing among the calculated spacings and determining it as representative of the width of the object to be recognized in the original image.

The image information recognition method set forth in one of the tenth aspect to the twelfth aspect, instead of the step of determining the minimum value spacing among the calculated spacings and determining it to be representative of the width of the object to be recognized in the original image, is used the step of comparing the minimum spacing among a plurality of rectilinear portions having the same inclination with the remaining spacings, and if the same spacing occurs at a plurality of locations, determining that spacing to be representative of the width between two adjacent linear components in equally spaced linear components throughout the entire image.

The image information recognition method set forth in one of the tenth aspect to the twelfth aspect, instead of the step of determining the minimum spacing among the calculated spacings and determining it to be representative of the width of the object to be recognized in the original image, is used the step of comparing the minimum spacing among a plurality of rectilinear portions having the same inclinations with the remaining spacings, in the event the same spacing does not occur at a plurality of locations, determining a second minimum spacing and comparing with the remaining spacings, and repeating such procedure until the same spacing occurs at a plurality of locations, whereupon such spacing is outputted as representative of the width between two adjacent linear components in equally spaced linear components throughout the entire image, and in the event the same spacing does not occur at a plurality of locations ultimately, determining the minimum spacing which was initially determined to be representative of the width of the object to be recognized.

As a result of the arrangement of the present invention as mentioned above, the use of Hough transformation allows the image to be efficiently extracted without requiring the registration.

DETAILED DESCRIPTION OF THE PREFERRED EMBODIMENTS

Now, several embodiments of the present invention will be described in detail with reference to the accompanying drawings.

Figure 1:
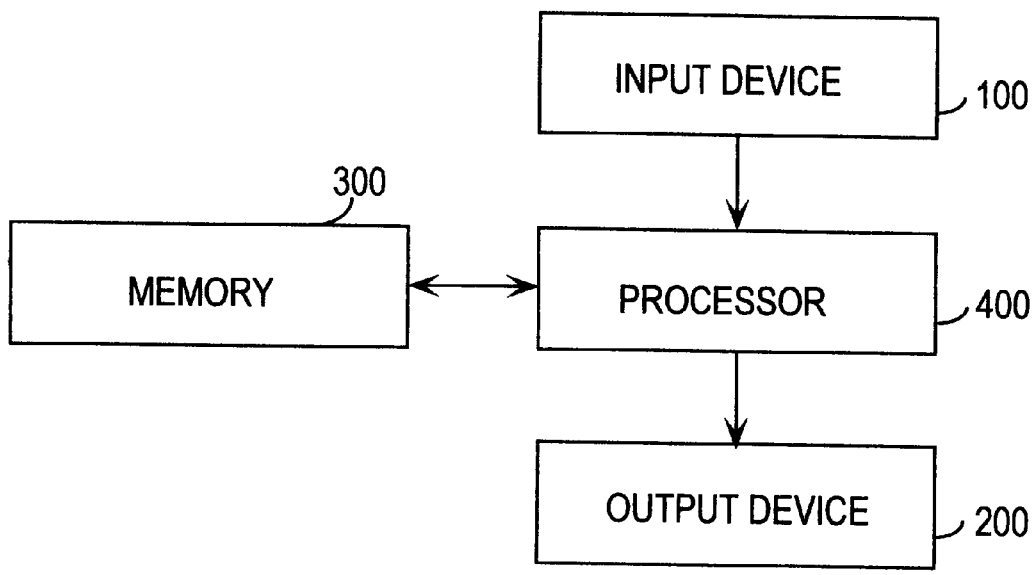
FIG. 1 is a block diagram showing a simplified overall arrangement of an image information recognition system to which the present invention is applicable.

FIG. 1 is a block diagram of a simplified overall arrangement of an image information recognition system to which the present invention is applicable. The system comprises an input device 100 to which a digital image of a semiconductor wafer, for example, may be fed, an output device 200 which may comprise a display or a printer, a memory 300 which is used to store an image processing program and numerical data during the image processing operation, and a processor 400 which processes the image input from the digital device 100 in accordance with the program stored in the memory 300 and delivers a result of processing to the output device 200.

FIGS. 2 to 8 are block diagrams showing arrangements for the first to seventh embodiments of the image information recognition system according to the present invention, and showing concrete circuit constructions of the processor 400 to which the present invention is applied. The digital image data which is input from the input device 100 to the processor 400 is once saved in an image memory (not shown) within the memory 300.

Figure 2:
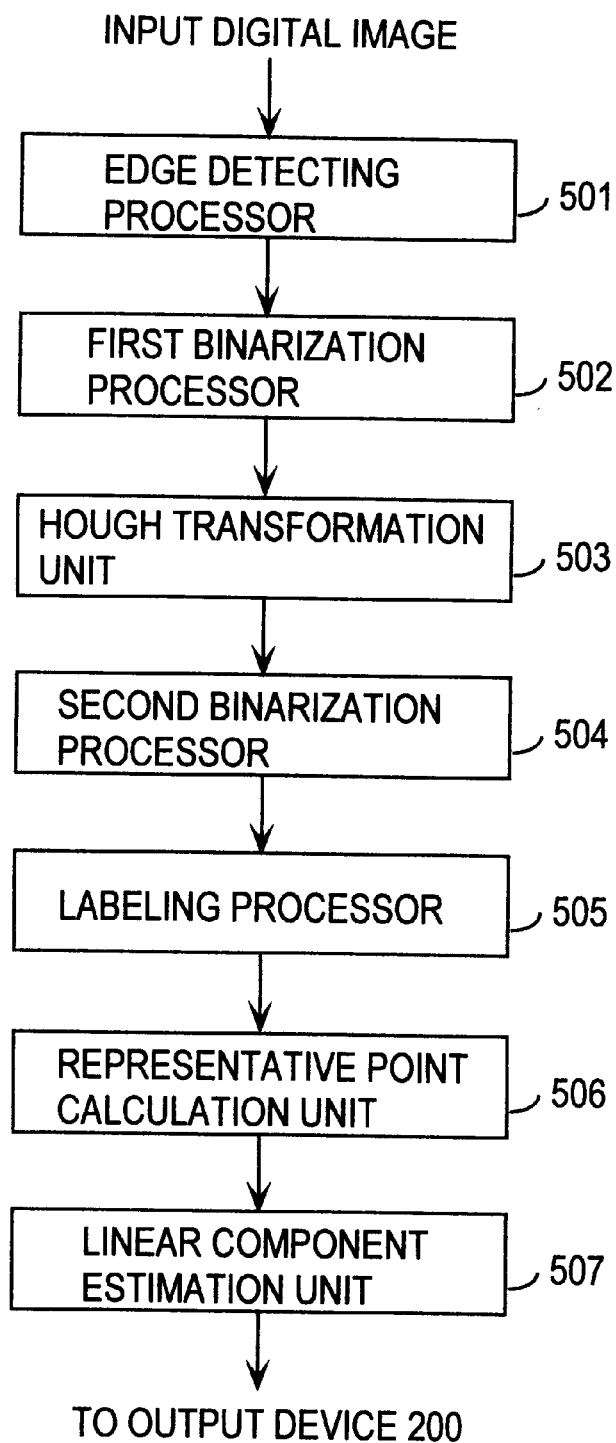
FIG. 2 is a block diagram of a first embodiment of the image information recognition system according to the present invention.

The first embodiment of the image information recognition system according to the present invention as shown in FIG. 2 will now be described.

In the first embodiment, the processor 400 comprises an edge detecting processor 501 which receives input digital image data, a first binarization processor 502 which converts image data, for which the edge is detected by the edge detecting processor 501, into binary valued data (binarization data), a Hough transformation unit 503 which applies the Hough transformation to the binarization data which is outputted from the first binarization processor 502, a is second binarization processor 504 which converts the Hough transformed image data from the Hough transformation unit 503 into binary valued data (binarization data), a labeling processor 505 which performs a labeling processing to the binarization data outputted from the second binarization processor 504, a representative point calculation unit 506 for selecting a representative point one for each label in the image data labeled by the labeling processor 505, the representative point calculation unit 506 including means for further selecting only one representative point among these selected representative points, and a linear component estimation unit 507 which estimates a number of linear equations which are equal in number to the number of rectilinear components in the original image from the output signals from the representative point calculation unit 506.

Digital image data which is saved in the image memory within the memory 300 may represent a digital version of the image of a semiconductor wafer, for example, and is fed to the edge detecting processor 501, which then operates to detect an edge contained in the input digital image data. It is to be understood that because of the digital image processing performed, such data is referred to as digital image data, but the digital image data also represents an image, and accordingly, hereafter will be referred to as digital image or simply as an image.

The technique for detecting an edge from a digital image which takes place within the edge detecting processor 501 may be any one of various techniques known in the art including the Sobel operator or Roberts edge detecting operator. A detailed description of an edge detecting technique for an image is contained in "Image analysis handbook" (edited by Takagi and Shimoda, published by Tokyo University Shuppankai), pp. 550–564.

After the edge detection by the edge detecting processor 501, the image is fed to the first binarization processor 502 where it is binarized. Since the edge detection in the edge detecting processor 501 calculates and plots a gradient in the picture element value in the vicinity of a picture element of interest, an area having an increased gradient or an edge area has a greater picture element value. The first binarization processor 502 binarizes the edge detected image using a suitable threshold value, thus forming a binarization image. In this binarization image, the edge area in the original image has active elements (having a picture element value of 1) while the remaining areas have inactive picture elements (having a picture element value of 0).

The binarization image from the first binarization processor 502 is fed to the Hough transformation unit 503 where it is subject to the Hough transformation. The Hough transformation is described in "Basis of image recognition" (by Mori and Sakakura, published by Ohm-sha), pp. 3–19, and therefore will be briefly described here.

The Hough transformation is a type of image processing which is used to detect a specific figure from a binarization image. The use of Hough transformation to detect a straight line from a binarization image will be considered here. Any straight line located on an image plane represented in x-y orthogonal coordinate system can be represented by using parameters (θ, ρ), as follows:

$$\rho = x \cos \theta + y \sin \theta \quad (0 \leq \theta \leq \pi)$$

where $|\rho|$ represents the length of a perpendicular to the straight line drawn from the origin 0 and θ represents an angle formed with the x-axis. For any point Pi (xi, yi) on the image plane, any straight line passing through a point (xi, yi) can be expressed as follows:

$$\rho = xi \cos \theta + yi \sin \theta$$

In this manner, when any straight line passing through a given point on the image plane is represented in terms of the parameters (θ, ρ), a curve depicted in the parameter space (θ–ρ coordinate system) is referred to as a Hough curve.

Figure 9A:
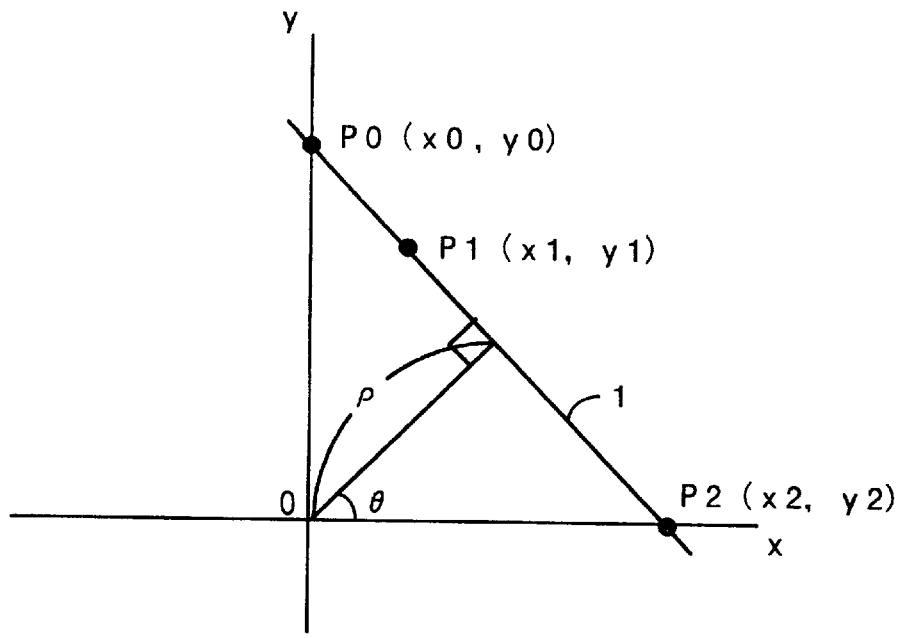
FIGS. 9(*a*) and (*b*) are diagrams illustrating the Hough transformation which is used in the practice of the present invention, FIG. 9(*a*) illustrating an image in the x-y coordinate system and FIG. 9(*b*) illustrating an image in the θ-ρ coordinate system which represents the Hough transformation of the image shown in FIG. 9(*a*)

Points on the straight line 1 on the image plane as represented in the x-y coordinate system as shown in FIG. 9(a) will be considered. Any straight line passing through a point P0(x0, y0) is expressed as follows:

$$\rho = x0 \cos \theta + y0 \sin \theta$$

Figure 9B:
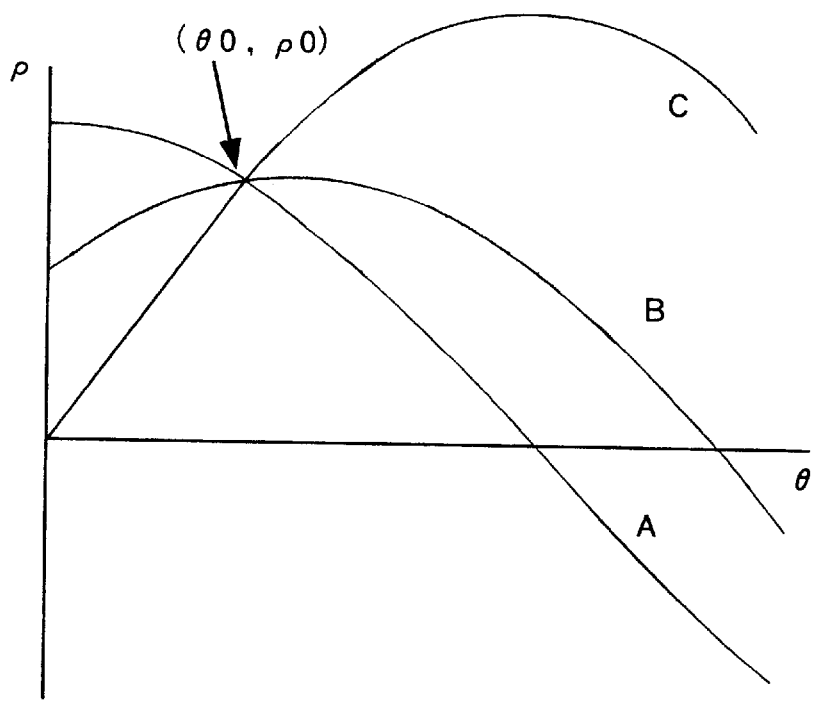

A Hough curve which represents any straight line passing through the point P0 in terms of parameters (θ, ρ) is depicted in the (θ–ρ coordinate system (parameter space) shown in FIG. 9(b) as a curve A.

Similarly, considering another point P1 (x1, y1) on the straight line shown in FIG. 9(a), any straight line passing through the point P1 is expressed as follows:

$$\rho = x1 \cos \theta + y1 \sin \theta$$

A Hough curve which represents any straight line passing through the point P1 in terms of the parameters (θ, ρ) is depicted in the (θ–ρ coordinate system shown in FIG. 9(b) as a curve B. Thus, the two Hough curves A and B depicted in the parameter space intersect with each other at a point (θ0, ρ0). The point of intersection (θ0, ρ0) provides the parameters of the original straight line.

Similarly, for any straight line passing through a further point P2(x2, y2) on the straight line 1 shown in FIG. 9(a), corresponding Hough curve is depicted in the θ–ρ coordinate system shown in FIG. 9(b) as a curve C, again passing through the single point (θ0, ρ0) in the parameter space. Thus the three Hough curves mentioned above intersects with each other at the point (θ0, ρ0).

In this manner, when Hough curves corresponding to multiple points on a single straight line are depicted in the θ–ρ coordinate system (parameter space), all of them intersects with each other at a single point (θ0, ρ0) defined by the parameters which represent the straight line.

What is described above is the fundamental principle of the Hough transformation when detecting a straight line. When the described technique is actually implemented with respect to a digital image, the picture element value at a quantized point (θ, ρ) corresponding to the Hough curve ρ=x cos θ+y sin θ (0≦θ≦π) for the point (x, y) on the straight line represented in the x-y coordinate system is incremented by one. This operation is referred to as a polling of Hough curves corresponding to the point (x, y).

When a polling of Hough curves is made for every active picture element in the binarization image, the curves intersects with each other at a point (θ0, ρ0) in the parameter space which corresponds to the rectilinear portion. In other words, that point has an increased picture element value. Accordingly, by searching for a point having the maximum picture element value in the parameter space subsequent to the polling of Hough curves, the linear component can be detected.

Assuming that the input digital image represents an image of a semiconductor wafer, by using the Hough transformation to detect a linear component from a binarization image which represents an edge component of a semiconductor wafer, the inclination θ of the wiring pattern which represents the linear component located in the image of the semiconductor wafer can be determined. A visualization into an image of the θ–ρ coordinate system (parameter space) subsequent to the polling of Hough curves with respect to a picture element in the binarization image representing the edge component will be referred to herein as Hough transformed image.

In practice, the noises may be mixed into the image, or the edge component of the wiring may not be a perfectly straight line. Accordingly, it is a rare occurrence that a polling is concentrated at a single point in the θ–ρ coordinate system, but it is a common occurrence that picture elements having an increased picture element value are collected in the vicinity of a given point with a certain degree of spread.

Accordingly, in the present embodiment, the Hough transformed image which is delivered from the Hough transformation unit 503 is fed to the second binarization processor 504 where the Hough transformed image is binarized using a suitable threshold, thus producing a second binarization image. An active element (having a value of 1) in the second binarization image indicates that a rectilinear component is located in the vicinity thereof. Thus, active picture elements are locally concentrated in an area in the parameter space where the linear component exists.

The second binarization image is fed to the labeling processor 505 where an area in which active picture elements are lumped adjacent to each other is treated as a group, which is designated by a different label from other groups. Thus, each label indicates the presence of a plurality of active picture elements which are lumped together. In the image which is labeled by the labeling processor 505, a plurality of active picture elements for each label correspond to a single straight line. Accordingly, the labeled image is fed to the representative point calculation unit 506 for selecting a representative point (θ0, ρ0) from the active picture elements for each label.

The selection of the representative point may select the coordinates of a center of gravity (a mean value for each of x- and y- coordinate) in the x-y coordinates of the plurality of picture elements for each label as the representative point or may extract picture elements corresponding to the plurality of active picture elements for the respective labels from the Hough transformed image and choosing the coordinates for the picture element which exhibits the highest picture element value for the representative point.

The representative point calculation unit 506 delivers the representative point selected in this manner as parameters of linear component which exists in the original image. In this instance, (θ0, ρ0) may be directly delivered as the parameters which characterize the linear component,, or may be converted into the form y=ax+b for delivery. in the latter instance, $$a=-\cot θ0, b=ρ0/\sin θ$$

may be delivered.

In this manner, by performing the calculation of representative point for active picture elements of each label which is applied by the labeling processor 505, every linear component which is present in the original image can be extracted, for example, every linear component of the wiring pattern for an image of the semiconductor wafer, for example, may be derived in terms of linear equations for the representative points of the respective labels. In addition, in order to determine the orientation (angle of rotation) of these linear equations, one from the representative points of the plurality of labels is selected. The selection of one representative point from the representative points for the plurality of labels takes place in the representative point calculation unit (or ( calculation unit) 506 in the manner mentioned below.

The wiring pattern in an image for the semiconductor wafer which is being detected normally comprises a plurality of straight lines running in a common direction (θ0). The labeling processor applies a different label to each of these straight lines so that the representative points of the respective labels (which are equal in number to the number of straight lines) appear at θ0 (coordinate) in a concentrated manner. In consideration of the influence of the noises, which causes the representative points to be dispersed, the number of representative points which are located in the vicinity of the representative point for each label is counted. A representative point (normally θ0) for a label for which a maximum number of representative points is found as a result of the counting operation is determined as representing the direction in which the wiring pattern runs, and thus is selected. The representative point calculation unit 506 derives the selected representative point to the linear component estimation unit 507 as indicating an angle of rotation of the wiring pattern component.

Using the coordinates (θ, ρ) of the representative points of the respective labels and an angle of rotation (θ0) which are calculated by the typifying unit calculation unit 506, the linear component estimation unit 507 derives the linear equation for every linear component which is present in the original image. The equation for the straight line in the image space of the x-y coordinate system which corresponds to the coordinates (θ, ρ) in the Hough transformed parameter space is given as follows:

$$ρ=x \cos θ+y \sin θ$$

In this equation, ρ represents a distance from the origin 0, and since θ=θ0, equations for the plurality of straight lines (which are equal in number to the number of linear components in the original image) having the same inclination and differing only in respect of the intercept are derived from the linear component estimation unit 507.

The equations for the plurality of straight lines which are delivered from the linear component estimation unit 507 are fed to the output device 200.

Figure 3:
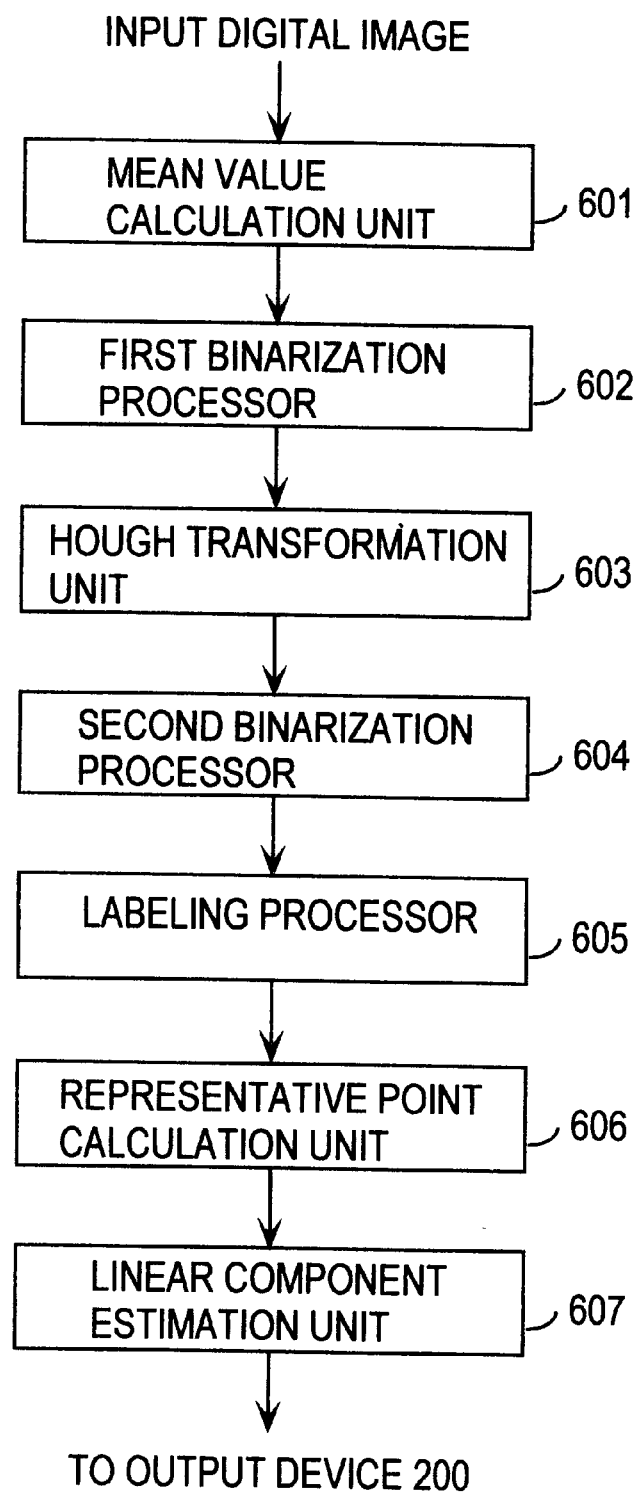
FIG. 3 is a block diagram of a second embodiment of the image information recognition system according to the present invention.

Referring to FIG. 3, a second embodiment of the image information recognition system according to the present invention will now be described.

In the second embodiment, the processor 400 comprises a mean value calculation unit 601 which receives input digital image data, a first binarization processor 602 which converts the difference is image data delivered from the mean value calculating unit 601 into binary valued data, a Hough transformation unit 603 which applies the Hough transformation to the binary valued data from the first binarization processor 602, a second binarization processor 604 for converting the Hough transformed image data from the Hough transformation unit 603 into binary valued data, a labeling processor 605 which applies a labeling processing operation to the binary valued data from the second binarization processor 604, a representative point calculation unit 606 for selecting a representative point for each label from the labeled image data from the labeling processor 605 and for selecting one from the selected representative points, and a linear component estimation unit 607 for estimating equations for straight lines, which are equal in number to the number of linear components in the original image, from the output signals of the representative point calculation unit 606.

The digital image data which is saved in the image memory within the memory 300 may be a digital image data for an image of a semiconductor wafer, for example, and is fed to the mean value calculation unit 601 where a difference image is produced. The mean value calculation unit 601 initially calculates a mean value M of all picture element values, and subtract the mean value M from the picture element value of all the elements to produce a difference image.

The difference image from the mean value calculation unit 601 is fed to the first binarization processor 602 where the image is binarized. As mentioned previously, the edge area in the original image has a greater gradient of the picture element values. Accordingly, the difference between the picture element value and the mean value is greater across the edge in comparison to the remainder. Accordingly, the absolute magnitude of the picture element value in the difference image is formed, and is binarized by using a suitable threshold, thus forming a binarization image. In the binarization image, an area adjacent to the edge in the original image have active picture elements (having a value of 1) while the remaining areas have inactive picture elements (having a value of 0).

The binarization image from the first binarization processor 602 is fed to the Hough transformation unit 603 where it is a subject to the Hough transformation. The Hough transformation which takes place in the Hough transformation unit 603 as well as other processing operations which take place subsequently in the second binarization processor 604, the labeling processor 605, the representative point calculation unit 606 and the linear component estimation unit 607 remain substantially similar to the corresponding processing operations which took place in the Hough transformation unit 503, the second binarization processor 504, the labeling processor 505, the representative point calculation unit 506 and the linear component estimation unit 507 of the first embodiment, and therefore will not be described again.

Also in the second embodiment, a number of equations for straight lines which are equal in number to the number of linear components in the original image, and having the same inclination but differing only in respect of intercept are derived from the linear component estimation unit 607, and are delivered to the output device 200.

Figure 4:
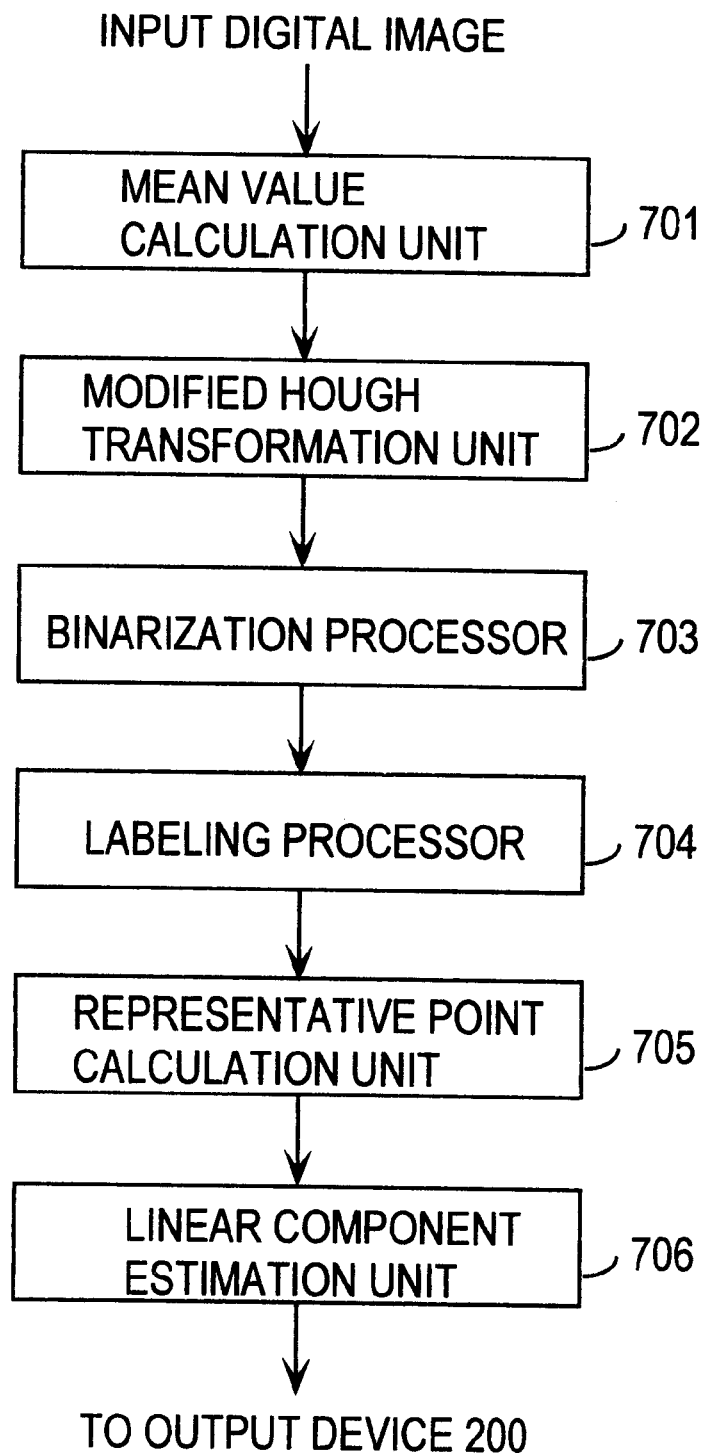
FIG. 4 is a block diagram of a third embodiment of the image information recognition system according to the present invention.

Referring to FIG. 4, a third embodiment of the image information recognition system according to the present invention will now be described.

In the third embodiment, the processor 400 comprises a mean value calculation unit 701 which receives input digital image data, a modified Hough transformation unit 702 which applies the Hough transformation to the image data which is output from the mean value calculation unit 701, a binarization processor 703, which converts the Hough transformed image data from the modified Hough transformation unit 702 into binary valued data, a labeling processor 704 which applies a labeling processing operation to the binary valued data from the second binarization processor 703, a representative point calculation unit 705 for selecting a representative point for each label from the labeled image data which is output from the labeling processor 704 and for also selecting one from these representative points, and a linear component estimation unit 706 for estimating a number of equations for straight lines, which are equal in number to the number of linear components in the original image, from the output signals from the representative point calculation unit 705.

The third embodiment is characterized in that the mean value M of picture element values for all picture elements in the input digital image data is calculated in the mean value calculation unit 701, and subsequently the original image is subject to the Hough transformation in the modified Hough transformation unit 702.

Because the image which is delivered from the mean value calculation unit 701 is not the binarization image, Hough curves will be drawn for every picture element (x, y) in the original image. In the Hough transformation which takes place in the θ–ρ coordinate system (parameter space) in the first and the second embodiment, the polling took place by incrementing by one the picture element value for every picture element corresponding to the Hough curve for the picture element of interest (xi, yi) in the x-y coordinate system, but in the present embodiment, the polling takes place by incrementing the picture element value for every picture element corresponding to the Hough curve for the picture element of interest (xi, yi) by the difference |t(xi, yi)−M| between the picture element value t of the picture element of interest (xi, yi) and the mean value M of picture element values for all the picture elements which is initially determined in the mean value calculation unit 701. This polling is referred to as modified Hough transformation.

As mentioned previously, the difference between picture element value and the mean value is greater across the edge in the original image in comparison to the remainder. Accordingly, a polling with a greater value occurs with Hough curves corresponding to the edge component of a linear line in the image, for example, the wiring pattern component. As a consequence, in the θ–ρ parameter space, a picture element (θ0, ρ0) corresponding to a linear component which is present in the original image has a higher value, whereby the estimation of the linear component is enabled. When the modified Hough transformation 702 is used, there is obtained an advantage that a polling of Hough curves corresponding to a picture element of interest (xi, yi) is directly possible without performing the edge detecting procedure or the binarization beforehand. The image obtained by the modified Hough transformation unit 702 is referred to herein as modified Hough transformed image.

The modified Hough transformed image delivered from the modified Hough transformation unit 702 is fed to the binarization processor 703 where the modified Hough transformation image is binarized using a suitable threshold, thus forming a binarization image. An active picture element (having a value of 1) in the binarization image indicates the presence of a linear component in the vicinity thereof. Thus, where the linear component exists in the θ–ρ parameter space, the active picture elements exist in a locally concentrated manner.

The binarization image is fed to the labeling processor 704 where a labeling processing operation takes place, namely, a different label is applied to each area where the active picture elements are lumped adjacent to each other and which is treated as a group. In this manner, each labeled group comprises a plurality of active picture elements which are lumped adjacent to each other. In the image which is labeled by the labeling processor 704, a plurality of active picture elements for each label corresponds to a single straight line. Accordingly, the labeled image is fed to the representative point calculation unit 705 where a representative point (θ0, ρ0) is selected from the active picture element for each label.

The selection of the representative point may select the coordinates of a center of gravity (a mean value for each of x- and y- coordinate) in the x-y coordinate system of the plurality of active picture elements for each label, or may extract a picture element which corresponds to a plurality of picture elements for each label from the modified Hough transformed image and select the coordinates of the picture element which have the highest picture element value as the representative point.

The representative point calculation unit 705 delivers the representative point selected in the manner mentioned above as the parameters of the linear component which exists in the original image. In this instance, (θ0, ρ0) may be directly delivered as the parameters which characterizes the linear component or it may be delivered in the form of y=ax+b. Where the output is in the form of y=ax+b, $$a=-\cot\theta 0,\ b=\rho 0/\sin\eta 0$$

may be delivered as outputs.

In this manner, by determining the representative point for the active picture elements of each label, every linear component which exists in the original image, for example, every linear component of the wiring pattern if the image represents an image of a semiconductor wafer, for example, can be extracted in terms of an equation for straight line which relates to a representative point for each label. In addition, in order to determine the orientation (angle of rotation) of the equation for the straight line, one from the representative points for a number of labels is selected.

The selection of one from the representative points for the number of labels may take place in the representative point calculation unit (o calculation unit) 705 in the manner mentioned is below.

The wiring pattern in the image of the semiconductor wafer which is being detected normally comprises a number of straight lines running in the same direction (θ0). Since the labeling operation applies a different label to each straight line, it will be seen that the representative points for respective labels (which are equal in number to the number of straight lines) will be located at θ0 coordinate in a concentrated manner. However, in consideration of the influence of noises which causes the representative points to be dispersed, the number of representative points located in the vicinity of a representative point for each label is counted. As a result of such counting operation, a representative point (normally θ0) for a label for which a maximum number of representative points are found is determined to be representative of the direction in which the wiring pattern runs, and thus is selected. The representative point calculation unit 705 delivers the representative point selected in this manner to the linear component estimation unit 706 as representing an angle of rotation of the wiring pattern component.

Using the coordinates (θ, ρ) of representative points for respective labels and the angle of rotation (θ0) which are calculated by the representative point calculation unit 705, the linear component estimation unit 706 derives equations for straight lines corresponding to every linear component which exists in the original image. The equation for the straight line in the image space of x-y coordinate system which corresponds to the coordinates (θ, ρ) in the modified Hough transformed parameter space is given as follows:

$$\rho = x\cos\theta + y\sin\theta$$

where (represents a distance from the origin 0. Since θ=θ0, a plurality of equations for straight lines (which are equal in number to the number of linear components in the original image) having the same inclination, but differing only in respect of the intercept are derived from the linear component estimation unit 706.

The plurality of equations for the straight lines which are delivered from the linear line estimation unit 706 are fed to the output device 200.

Figure 5:
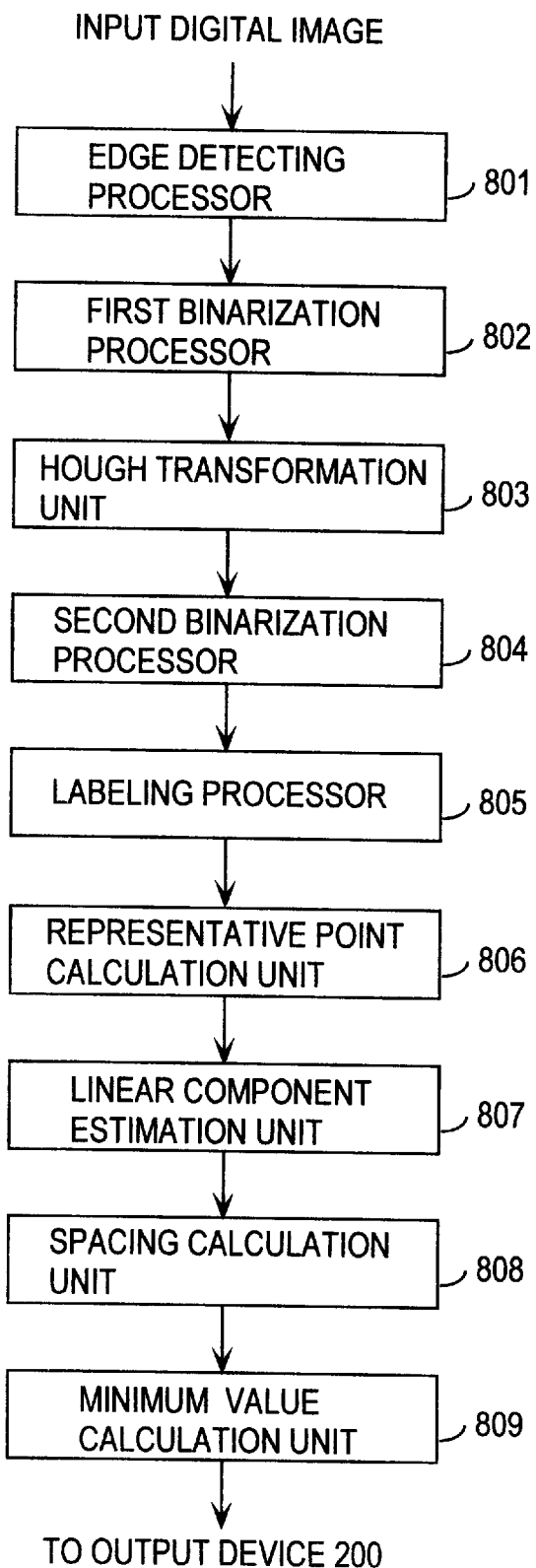
FIG. 5 is a block diagram of a fourth embodiment of the image information recognition system according to the present invention.

Referring to FIG. 5, a fourth embodiment of the image information recognition system according to the present invention will be described.

In the present embodiment, an edge detecting processor 801, a first binarization processor 802, a Hough transformation unit 803, a second binarization processor 804, a labeling processor 805, a representative point calculation unit 806 and a linear component estimation unit 807 are substantially identical to the edge detecting processor 501, the first binarization processor 502, the Hough transformation unit 503, the second binarization processor 504, the labeling processor 505, the representative point calculation unit 506 and the linear component estimation unit 507, respectively, shown in FIG. 2 and described above in connection with the first embodiment, and therefore will not be specifically described.

In the present embodiment, a spacing calculation unit 808 determines a spacing between straight lines which are defined by the linear equations which are determined by the linear component estimation unit 807. For the linear equations mentioned above, the spacing between a pair of straight lines ρa=x cos θ+y sin θ, ρb=x cos θ+y sin θ is defined as |ρa−ρb|. The spacing between immediately adjacent two straight lines is calculated in the ascending or descending order of (, using a plurality of equations for straight lines which have same inclination.

A minimum value calculation unit 809 selects a minimum spacing between immediately adjacent two straight lines from those spacings which are calculated by the spacing calculation unit 808. The minimum spacing is determined to be as representative of the width of a narrowest portion of the wiring pattern, and is delivered as a characterizing quantity relating to the magnification of the image being detected.

Figure 6:
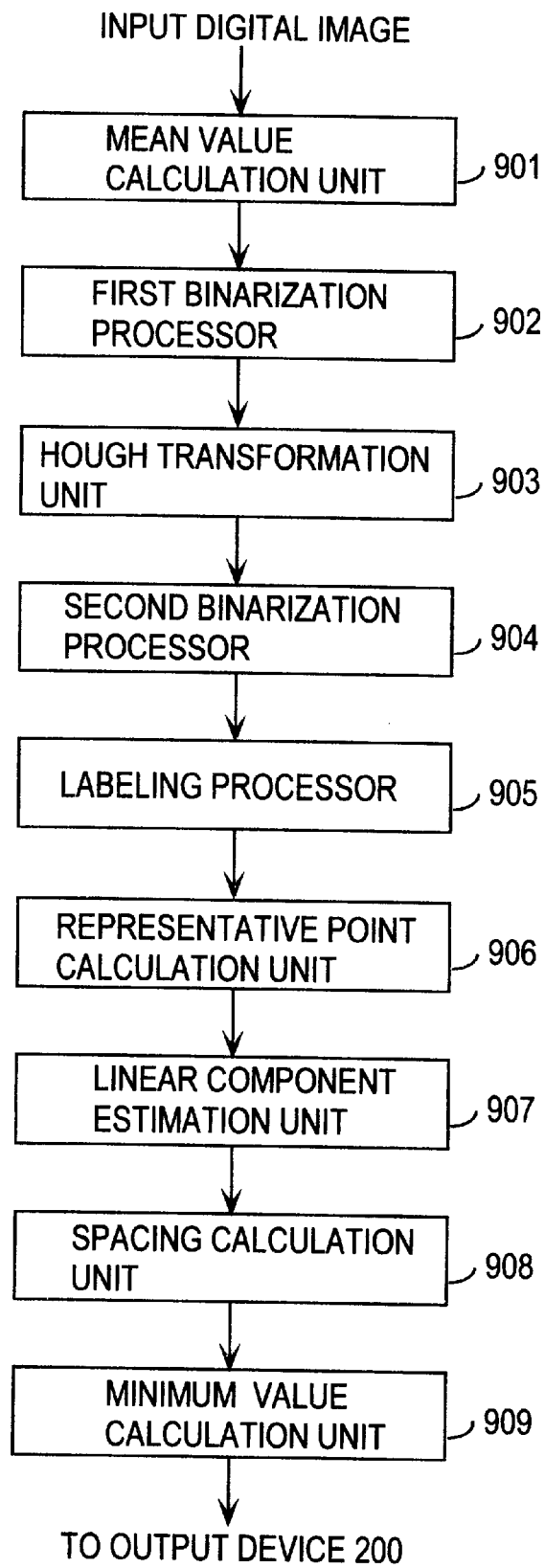
FIG. 6 is a block diagram of a fifth embodiment of the image information recognition system according to the present invention.

Referring to FIG. 6, a fifth embodiment of the image information recognition system according to the present invention will be described.

In the present embodiment, a mean value calculation unit 901, a first binarization processor 902, a Hough transformation unit 903, a second binarization processor 904, a labeling processor 905, a representative point calculation unit 906 and a linear component estimation unit 907 are similar to the mean value calculation unit 601, the first binarization processor 602, the Hough transformation unit 603, the second binarization processor 604, the labeling processor 605, the representative point calculation unit 606 and the linear component estimation unit 607, respectively, shown in FIG. 3 and described above in connection with the second embodiment, and a spacing calculation unit 908 and a minimum value calculation unit 909 of the present embodiment are substantially similar to the spacing calculation unit 808 and the minimum value derivation unit 809, respectively, shown in FIG. 5 and described above in connection with the fourth embodiment. Accordingly, these processors and units will not be specifically described.

Figure 7:
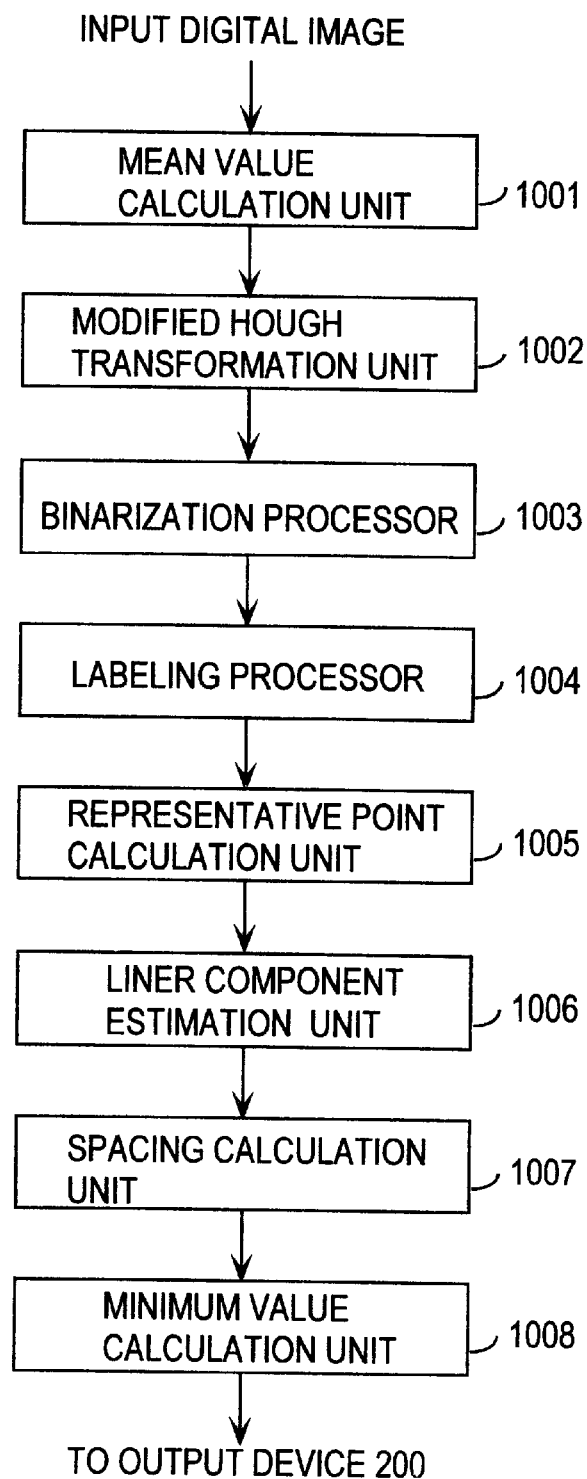
FIG. 7 is a block diagram of a sixth embodiment of the image information recognition system according to the present invention.

Referring to FIG. 7, a sixth embodiment of the image information recognition system according to the present invention will be described.

In the present embodiment, a mean value calculation unit 1001, a modified Hough transformation unit 1002, a binarization processor 1003, a labeling processor 1004, a representative point calculation unit 1005 and a linear component estimation unit 1006 are similar to the mean value calculation unit 701, the modified Hough transformation unit 702, the binarization processor 703, the labeling processor 704, the representative point calculation unit 705 and the linear component estimation unit 706, respectively, shown in FIG. 4 and described above in connection with the third embodiment, and a spacing calculation unit 1007 and a minimum value calculation unit 1008 of the present embodiment are substantially similar to the spacing calculation unit 808 and the minimum value calculation unit 809, respectively, shown in FIG. 5 and described above in connection with the fourth embodiment. Accordingly, these processors and units will not be specifically described.

Figure 8:
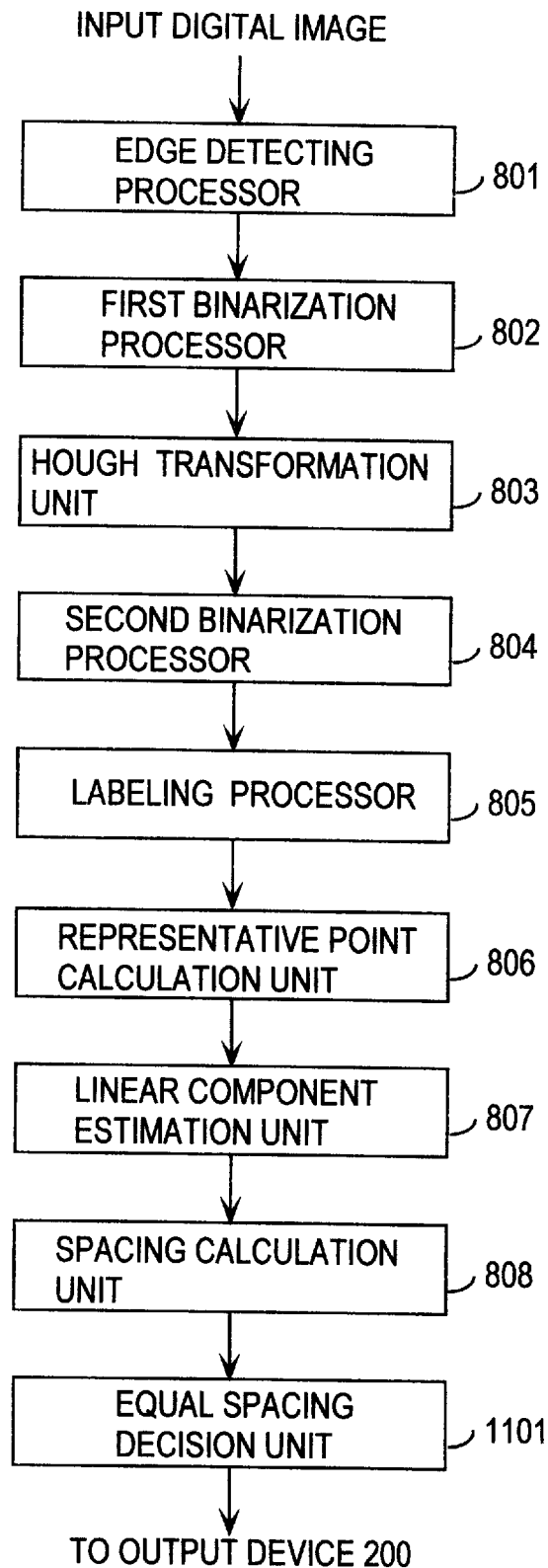
FIG. 8 is a block diagram of a seventh embodiment of the image information recognition system according to the present invention.

Referring to FIG. 8, a seventh embodiment of the image information recognition system according to the present invention will be described.

The present embodiment corresponds to the fourth embodiment shown in FIG. 5 in which the minimum value calculation unit is replaced by an equal spacing decision unit 1101.

The equal spacing decision unit 1101 compares the minimum spacing among a plurality of straight lines having the same inclination and which is determined by the spacing calculation unit 808 against other spacings, and in the event the minimum spacing occurs a plurality of times, delivers such spacing as the characterizing quantity relating to the magnification of the image being detected.

The reason why the equal spacing decision unit 1101 operate in the manner mentioned above will now be described. Very frequently, an image of a wiring pattern on a wafer includes similar wirings aligned at an equal spacing. Accordingly, if the same spacing occurs a plurality of times, such spacing may be regarded as representing the spacing in an equally spaced wiring pattern. When images relate to the same sample, it follows that any difference in the spacing corresponds to a difference in the magnification, and accordingly, the spacing which is regarded as the spacing of the wiring pattern is delivered as the characterizing quantity which relates to a magnification of the image being detected.

An eighth embodiment of the image information recognition system according to the present invention will now be described. In the present embodiment, the operation of the equal spacing decision unit 1101 of the seventh embodiment is modified.

In the present embodiment, an equal spacing decision unit 1101 is arranged such that is a single minimum spacing among a plurality of straight line is found, but a second occurrence of the same minimum spacing is not found, a second minimum spacing is then searched, and if the second minimum spacing has a plurality of occurrences, the second minimum spacing is delivered as a characterizing quantity which relates to the magnification of the image being detected.

If a second occurrence of the second minimum spacing is not found, the next minimum spacing is searched and this operation is repeated until a spacing is found for which a plurality of occurrences is recognized, whereupon such spacing is delivered as a characterization quantity which relates to the magnification of the image being detected across the entire image.

It will be seen that a wafer having a complicated structure may include a wiring pattern, the image of which does not include wirings at an equal spacing. Accordingly, there is instances in which the same spacing does not occur a plurality of times. In the present embodiment, if any particular spacing does not occur for the second time until the last spacing is searched out, a decision is rendered that a minimum spacing which is detected initially represents the narrowest spacing of the wiring pattern which exists within the image being considered, and such minimum spacing is delivered as representing the width of the object being recognized.

A specific example of the present invention will now be described.

Figure 10:
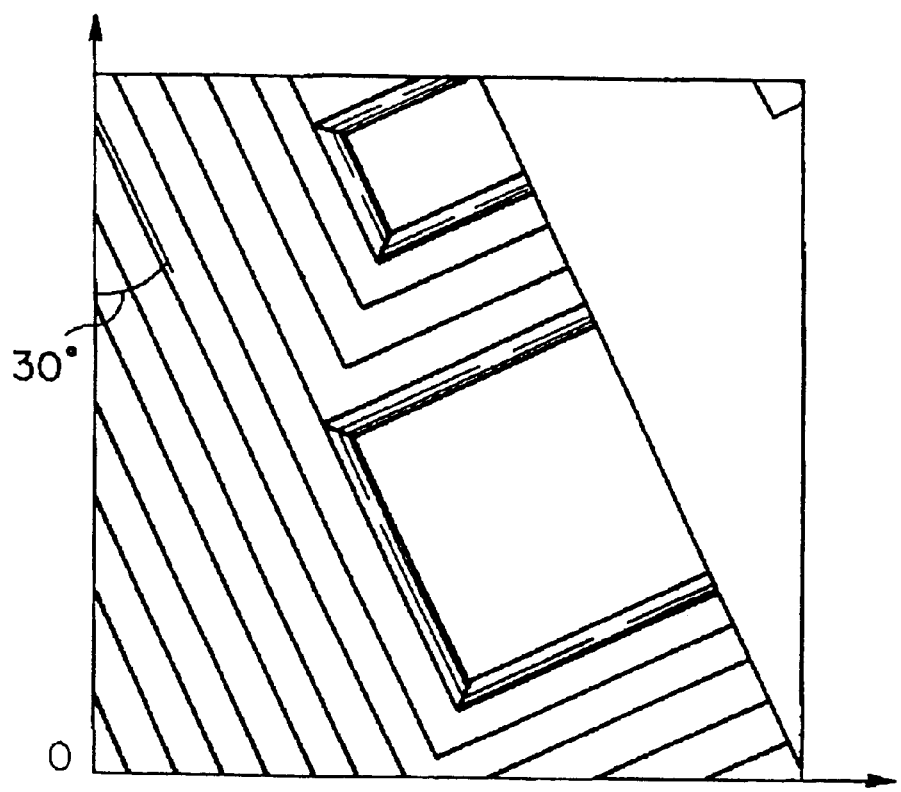
FIG. 10 is an illustration of an image of a semiconductor wafer taken by the scanning electron microscope (in 256 gradations of semiconductor gray scale)

FIG. 10 is a schematic illustration of an SEM image of a wafer (in 256 gradations of a semiconductor gray scale) where it is assumed that the picture element values in the original image have a mean value of M, a maximum value of Mmax and a minimum value of Mmin. Wiring pattern component in the image has an angle of 30° with respect to the y-axis. There is also a wiring component which is perpendicular to the wiring pattern shown, but what is dealt with as the object being detected is the wiring pattern which represents a major proportion.

Figure 11:
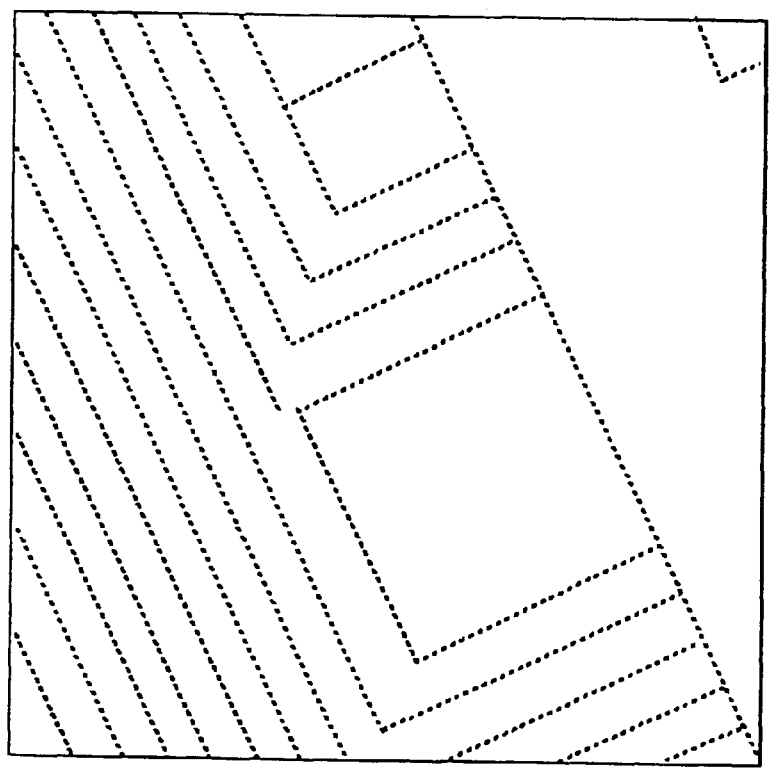
FIG. 11 is a view showing a result of applying Roberts edge detecting operator to the image shown in FIG. 10.

According to the first and the fourth embodiment, the edge detecting procedure is applied to the original image. FIG. 11 is a schematic illustration of an outcome of applying Roberts edge detecting operator to the original image.

Figure 12:
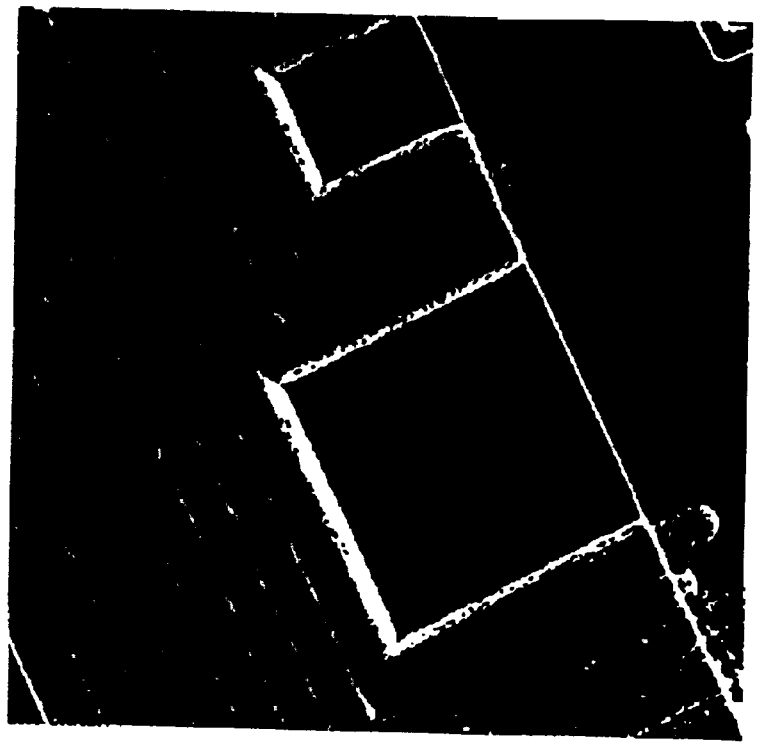
FIG. 12 is a view showing a result of applying a binarization process to the difference image for the image shown in FIG. 10.

According to the second and the fifth embodiment, the original image is subject to the binarization. The binarization takes place under the condition given below:

$$|t-M| > 3\Sigma$$

where t represents a picture element value of each picture element, M the mean value of the image and $\Sigma$ a standard deviation. An outcome of the binarization under this condition is shown in FIG. 12.

Subsequently, the Hough transformation is applied to the image shown in FIG. 11 or 12. There results a similar outcome if the Hough transformation is applied to either the image as shown in FIG. 11 which is obtained by the application of the Roberts edge detecting operator or the image shown in FIG. 12 which is directly binarized from the original image.

According to the third and the sixth embodiment, a polling of Hough curves takes place for all picture elements in the original image. While the Hough transformation normally increments the picture element corresponding to the Hough curves by a picture element value of 1, in the present instance, the amount of increment is chosen to be $|t(x,y)-M|$ where $t(x,y)$ represents the value of each picture element and M the mean value of all the picture element values. While the normal Hough transformation is applied only to an active picture element in the binarization image, according to the third and the sixth embodiment, the Hough transformation is applied to all the picture elements, and accordingly, respective picture elements in the $\theta-\rho$ parameter space of the polling rate have greater values than in normal Hough transformation. However, as a general trend, a greater value is polled to an area which corresponds to the edge portion of the image, and thus the Hough transformation is applied to an image shown in either FIG. 11 or FIG. 12. A similar outcome yields when the Hough transformation is applied to the image as shown in FIG. 11 which results from the application of the Roberts edge detecting operator or to the image as shown in FIG. 12 which is obtained by the direct binarization of the original image.

The Hough transformed image or modified Hough transformed image which is obtained in the manner mentioned above is then subject to the binarization. The threshold used in the binarization is given, for example, by $$M P + 3\Sigma$$

where MP represents the mean value among the picture element values and $\Sigma$ represents the standard deviation of picture element values in the $\theta-\rho$ parameter space. A result of binarization with the above threshold of the image shown in FIG. 10 is indicated in FIG. 13.

Figure 13:
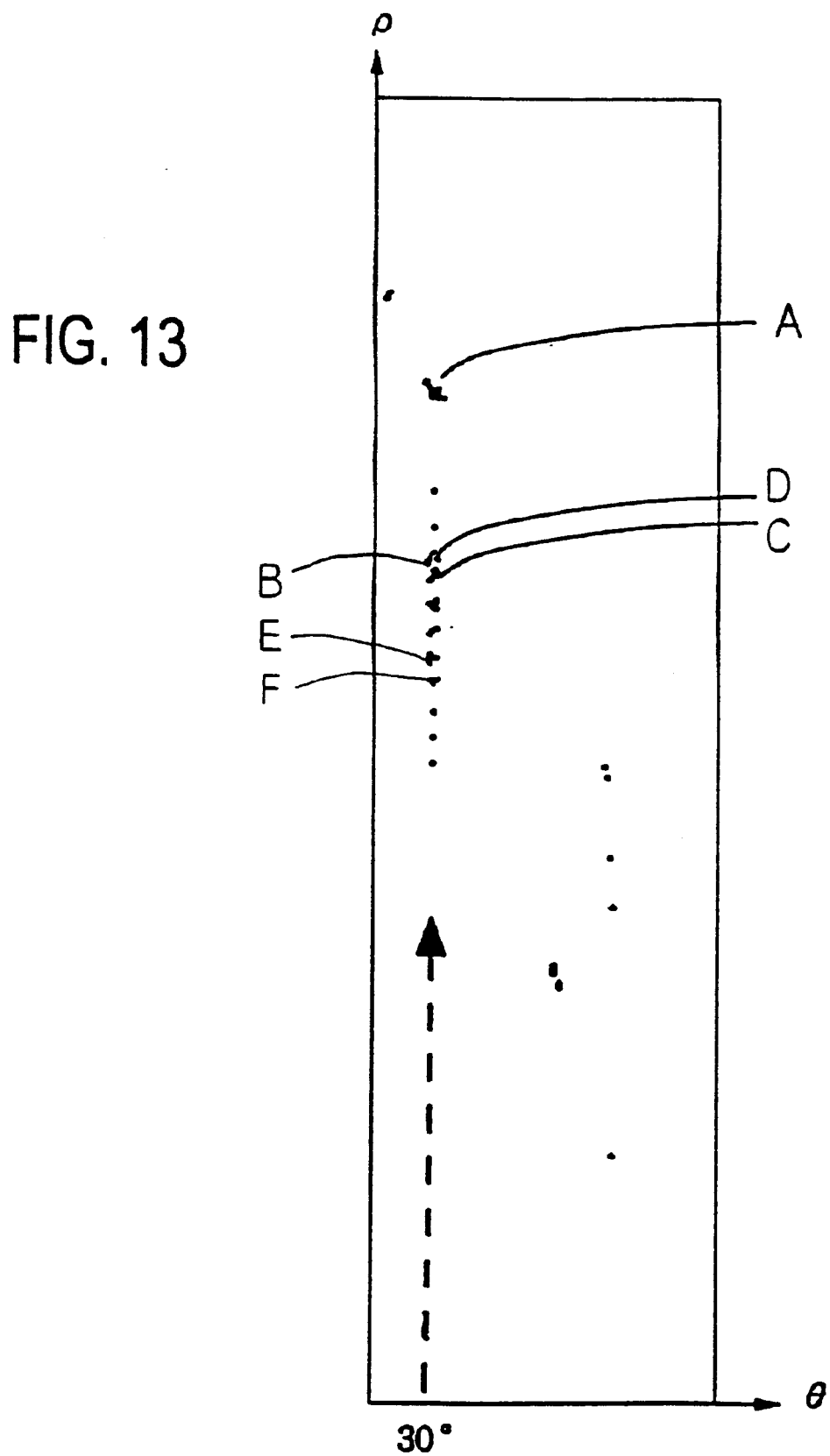
FIG. 13 is a view showing a result of binarization obtained by applying the modified Hough transformation to the image shown in FIG. 10 and binarizing the transformed image with a specified threshold.

Both the mean value MP and the standard deviation $\Sigma$ assume greater values for the image in the $\theta-\rho$ parameter space which results from the application of the modified Hough transformation, but when the above threshold for the binarization is used, there is obtained an image which is similar to that shown in FIG. 13. It will be noted from the image shown in FIG. 13 that active picture elements are locally lumped in an area which corresponds to a linear component which is present in the original image.

The binarization image is then subject to the labeling processing operation, thus collecting adjacent picture elements into a group, which is then labeled. In this manner, there results a plurality of labels.

For each label, a representative point (θi, ρi) is selected. To serve as a representative point, a center of gravity ((mean value of x- coordinate), (mean value of y-coordinate)) is calculated for each label.

According to the first to the third embodiment, the coordinates (θi, ρi) of the representative point which is determined in this manner are delivered as the parameters which characterize the linear component in the original image. In the example shown in FIG. 13, 17 labels are produced by the labeling processing operation, and accordingly, the coordinates (θi, ρi) of the center of the gravity for each label are delivered as parameters which characterizes the straight line ρ=x cos θ+y sin θ. Alternatively, the coordinates (θi, ρi) may be used to provide the form y=ax+b.

By way of example, it is assumed that representative points determined from FIG. 13 include one (θi, ρi)=(30°, 501) (which corresponds to point A in FIG. 13). When it is substituted for a=−cot θ0, b=ρi/sin θ which are equations in the form of the equation y=ax+b, the result is:

$$a = -\cot \theta_i \approx 1.733, \quad b = \rho_i/\sin \theta_i = 1002$$

and thus we have $$y = -1.733x + 1002$$

Such conversion may be applied to every representative point for each label, whereby a linear component which is present in the original image, or edge information for the wiring pattern if the original image represents an image of the semiconductor wafer, can be detected. It should be noted that the linear equation is based on the origin 0 shown at the left lower corner in FIG. 10.

According to the fourth to the sixth embodiments, the binarization image is also labeled and the coordinates of the center of gravity is calculated to serve as the representative point for each label. It will be noted that there is one representative point for each line of wiring pattern in the original image, and thus it will be seen that where there are a plurality of lines in the wiring pattern which are oriented in the same direction, there occur a plurality of representative points or a plurality of labels at a given value of θ in a concentrated manner. In consideration of this, θ is scanned from 0 to 180°, and the number of representative points which exists for each value of θ, for example, in a region of θ±3° is counted to determine a particular value of θ where the number of representative points is at maximum.

In the example shown in FIG. 13, twelve labels are detected around θ=30°. The existence of 12 labels around θ=30° in a concentrated manner allows a decision to be rendered that θ=30°. Since this is the process of specifying in which direction most wiring pattern is running, it follows that a recognition of the direction in which the wiring pattern is generally directed is enabled.

The spacing between two adjacent coordinates among the coordinates of the center of gravity for 12 labels around θ=30° corresponds to the spacing between two adjacent lines among the lines in the wiring pattern in the original image. Accordingly, the spacing between the centers of gravity for two adjacent labels from twelve coordinates is calculated, and the minimum spacing is outputted as the width between the two adjacent lines (the line width) of the wiring pattern.

In the example shown in FIG. 13, at θ=30°, the spacing between point B and point C is equal to 27 picture elements (where one picture element is an arbitrary unit), which is at the minimum. Accordingly, the line width of the wiring pattern is outputted as having a value of 27. Thus, in the fourth to the sixth embodiments, the final output of the processor 400 is one in which an angle of rotation is 30° and the line width of wiring pattern is 27.

If the same sample has been photographed under a different condition to provide an image, which yielded a line width of a wiring pattern of 10 when it is analyzed according to the present invention, a decision can be rendered that the image shown in FIG. 10 has been taken with a magnification which is 2.7 times that of the separate image.

According to the seventh embodiment, the minimum spacing between the representative points for respective labels which are calculated according to the fourth to the sixth embodiments is compared with the remaining spacings. Since there are twelve labels at θ=30° in the example shown in FIG. 13, there are eleven spacings between adjacent labels. It has been already determined that the minimum spacing was located between the point B and the point C and was equal to 27 picture elements. It is assumed that among these eleven spacings, there is another location where the spacing is equal to 27 picture elements, and the spacing is equal to 28 picture elements at seven locations of the remaining nine locations. Regarding a variation within ±2 picture elements as an error range, it follows that the spacing which is equal to the minimum spacing of 27 picture elements occurs at nine locations, and accordingly, the spacing of 27 picture elements is outputted as representative of the spacing between the two adjacent lines in the equally spaced wiring pattern.

Assume that in FIG. 13, a label which should not appear be detected under the influence of noises or the like. Specifically, a representative point D for a separate label is detected between the points B and C, with a spacing between B and D equal to 10 picture elements and a spacing between D and C equal to 17 picture elements.

According to the fourth to the sixth embodiments, the minimum spacing of 10 picture elements (as between B and D) is obtained. However, there is no other occurrence at θ=30° of the spacing which is equal to the spacing of 10 picture elements. The next minimum spacing is then searched for, thus obtaining a spacing of 17 picture elements between D and C. However, there is no other occurrence of the spacing which is equal to 17 picture elements. The third minimum spacing is then searched for, obtaining a spacing of 27 picture elements as between point E and point F. There is another occurrence for this value of spacing, and accordingly, the spacing which is equal to 27 picture elements is outputted as representative of the spacing between the two adjacent lines of the equally spaced wiring pattern.

In this manner, even if a label which should not appear be detected under the influence of noises or the like, the angle of rotation (30°) and the pattern spacing (27 picture elements) for the image of the wafer pattern in the normal state are obtained for the wafer pattern image.

Now, the processing rate according to the present invention will be described in comparison to the conventional technique or the pattern matching technique.

It is assumed that the original image has 512(512=262144 Pixels=N Pixels (N=262144).

During the edge detection, the edge detecting operator and the binarization take place in either according to the present invention or according to the pattern matching technique, and the required volume of computation is similar, as indicated below.

Edge detecting operator (Sobel 3×3 operator)
{(multiplication: 3×3)+(addition: 1)}×N
Binarization
   (conditional processing)×N As a result of binarization, the sample according to the embodiment of the present invention which is illustrated by FIG. 11 has active picture elements ≈8000 Pixels.

The volume of computation subsequently needed according to the present invention for performing the Hough transformation and the binarization is given below.
Volume of computation needed for the present invention
Hough transformation
   {[(calculation of triangular function+multiplication)×2+ addition 2]×360}×8000
   ($0° \leq \theta \leq 360°$, in increment of 1°)
Binarization
   (conditional processing)×360×800
   ($0 \leq \rho \leq 800$)

On the other hand, the volume of computation needed for the conventional or the pattern matching technique is given below.
   {(addition/subtraction: 256)+addition+conditional processing}×360×N The conditional processing takes places as (addition/subtraction+reversal of sign=addition/subtraction×2). The calculation of triangular function may be replaced by a memory access since the required calculation can be made by referring to a table of triangular functions in terms of θ.

As a consequence, the total volume of computation needed in the present invention which uses the Hough transformation is as given below.

| addition/subtraction: | 2N + 360 × 2 × (8000 + 1600) |
| --- | --- |
| multiplication: | 9N + 360 × 2 × 8000 |
| memory access: | 360 × 2 × 8000 |
| TOTAL: | 11N + 360 × 2 × 25600 ≈ 83N |
| | (N ≈ 262000) |

The total volume of computation needed according to the conventional technique which applies the pattern matching technique is as given below.

| addition/subtraction: | 2N × (N + 360 × N) |
| --- | --- |
| multiplication: | 9N + 360 × N |
| memory access: | 0 |
| TOTAL: | 11N + 1080N = 1091N |

It will be seen from the above illustration that the first or the fourth embodiment is by a factor of about 13 more advantageous than the pattern matching technique in respect of the volume of computation. The second or the fifth embodiment dispenses with edge detecting procedure, and thus reduces the volume of computation, which results in an advantage by a factor of about 14 as compared with the conventional technique.

The third or the sixth embodiment does not use the binarization. but applies the Hough transformation to every picture element, thus increasing the volume of computation as compared with the conventional technique. However, it should be noted that the conventional technique or the first embodiment may fail to detect the edge component in the event the edge is blurred or indistinct.

By contrast, each of the second to the fourth and the sixth embodiment operates to detect an area where there is a greater difference over the mean value of picture element values, providing an advantage that the detection is enabled if the edge remains indistinct. It will thus be seen that the present invention is advantageous in respect of the technique of extracting a characterizing quantity as well as the processing rate.

The embodiments have been described above for an instance of detecting a linear component such as a wiring pattern from an image of a semiconductor wafer or printed board, but it should be noted that the present invention is applicable to an image (or photograph) of other devices and articles than the semiconductor wafer or the printed board such as in detecting a linear component in the image (or photograph) of the earth surface.

For example, an aerial photograph taking a picture of street from the air contains road information in the form of linear line information. When the present invention is applied to such image, it is possible to determine in which direction the road is directed. If the opposite ends of the road are detected as edge information, the width of the road can be determined in accordance with the present invention. If the minification of the aerial photograph is previously known, it is possible to specify the width of the actual road. Conversely, if the width of the road which appears on the photograph is known, it is possible to estimate the minification of the aerial photograph.

As discussed in detail above, in accordance with the present invention, the Hough transformation is applied to an image on which a plurality of straight lines run parallel to each other in a given direction as occurs in an image of a wiring pattern on a printed board or a semiconductor wafer, thus determining a linear equation from the result of the Hough transformation. Accordingly, it is possible to quantify an angle of rotation of the entire image, the width of a linear component or a magnification/minification of the image each as a characterizing quantity. In this manner, the present invention brings forth a remarkable advantage that a linear component in the image can be detected using the pattern matching technique without the need for registering operation.

A delicate curvature in the rectilinear portion or a displacement of the straight line disabled the detection with the conventional technique in which the linear component is detected by the pattern matching technique after the digital image data has been subjected to binarization. By contrast, the present invention provides an advantage that the detection is enabled in the presence of any slight curvature or displacement of the linear portion.

What is claimed is:

1. An image information recognition system for inspecting, recognizing or judging an object using an image thereof, comprising:

edge detecting means for detecting an edge component from input digital image data;

first binarization processor means for processing an image obtained by the edge detecting means by use of a threshold to provide binarization image data comprising active picture elements and inactive picture elements;

Hough transformation means for applying a Hough transformation to the binarization image obtained by the first binarization processor means;

second binarization processor means for processing the Hough transformed image from the Hough transformation means by use of a threshold to provide binarization image data comprising active picture elements and inactive picture elements;

labeling processor means for grouping adjacent picture elements in the binarization image obtained by the second binarization processor means;

representative point calculation means for determining the coordinates of a representative point of each group of adjacent picture elements grouped by the labeling processor means; and linear component estimation means for determining a linear equation for a rectilinear portion in the edge component in the original image from the coordinate information of respective representative points found by the representative point calculation means.

2. An image information recognition system for inspecting, recognizing or judging an object using an image thereof, comprising:

mean value calculation means for calculating a mean value M of all picture element values from input digital image data and for subtracting the mean value M from the picture element value of each of the picture elements in the original image data to produce a difference image data;

first binarization processor means for processing the difference image data obtained by the mean value calculation means by use of a threshold to provide binarization image data comprising active picture elements and inactive picture elements;

Hough transformation means for applying a Hough transformation to the binarization image obtained by the first binarization processor means;

second binarization processor means for processing the Hough transformed image from the Hough transformation means by use of a threshold to provide binarization image data comprising active picture elements and inactive picture elements;

labeling processor means for grouping adjacent picture elements in the binarization image obtained by the second binarization processor means;

representative point calculation means for determining the coordinates of a representative point of each group of adjacent picture elements grouped by the labeling processor means; and linear component estimation means for determining a linear equation for a rectilinear portion in the edge component in the original image from the coordinate information of respective representative points found by the representative point calculation means.

3. An image information recognition system for inspecting, recognizing or judging an object using an image thereof, comprising:

mean value calculation means for calculating a mean value M of all picture element values from input digital image data;

modified Hough transformation means for applying a Hough transformation $$\rho = x \cos\theta + y \sin\theta$$

to each picture element (its coordinates (x, y)) of the original image and for effecting a polling in the $\theta$–$\rho$ parameter space with a weight equal to the difference $|t(x, y)-M|$ between the picture element value t and the mean value M calculated by the mean value calculation means;

binarization processor means for processing the modified Hough transformed image from the modified Hough transformation means by use of a threshold to provide binarization image data comprising active picture elements and inactive picture elements;

labeling processor means for grouping adjacent picture elements in the binarization image obtained by the second binarization processor means;

representative point calculation means for determining the coordinates of a representative point of each group of adjacent picture elements grouped by the labeling processor means; and linear component estimation means for determining a linear equation for a rectilinear portion in the edge component in the original image from the coordinate information of respective representative points found by the representative point calculation means.

4. An image information recognition system for inspecting, recognizing or judging an object using an image thereof, comprising:

edge detecting means for detecting an edge component from input digital image data;

first binarization processor means for processing an image obtained by the edge detecting means by use of a threshold to provide binarization image data comprising active picture elements and inactive picture elements;

Hough transformation means for applying a Hough transformation to the binarization image obtained by the first binarization processor means;

second binarization processor means for processing the Hough transformed image from the Hough transformation means by use of a threshold to provide binarization image data comprising active picture elements and inactive picture elements;

labeling processor means for grouping adjacent picture elements in the binarization image obtained by the second binarization processor means;

representative point calculation means for determining the coordinates of a representative point of each group of adjacent picture elements grouped by the labeling processor means;

linear component estimation means for determining a linear equation for a rectilinear portion in the edge component in the original image from the coordinate information of respective representative points found by the representative point calculation means;

spacing calculation means operative when there are a plurality of rectilinear portions oriented in the same direction as determined by the linear component estimation means to calculate a spacing between adjacent rectilinear portions from information representing intercepts of the plurality of rectilinear portions; and minimum value calculation means for determining the minimum spacing among the spacings calculated by the spacing calculation means and for outputting it as representative of the width of an object to be recognized in the original image.

5. An image information recognition system for inspecting, recognizing or judging an object using an image thereof, comprising:

mean value calculation means for calculating a mean value M of all picture element values from input digital image data and for subtracting the mean value M from the picture element value of each of the picture elements in the original image data to produce a difference image data;

first binarization processor means for processing the difference image data obtained by the mean value calculation means by use of a threshold to provide binarization image data comprising active picture elements and inactive picture elements;

Hough transformation means for applying a Hough transformation to the binarization image obtained by the first binarization processor means;

second binarization processor means for processing the Hough transformed image from the Hough transformation means by use of a threshold to provide binarization image data comprising active picture elements and inactive picture elements;

labeling processor means for grouping adjacent picture elements in the binarization image obtained by the second binarization processor means;

representative point calculation means for determining the coordinates of a representative point of each group of adjacent picture elements grouped by the labeling processor means;

linear component estimation means for determining a linear equation for a rectilinear portion in the edge component in the original image from the coordinate information of respective representative points found by the representative point calculation means;

spacing calculation means operative when there are a plurality of rectilinear portions oriented in the same direction as determined by the linear component estimation means to calculate a spacing between adjacent rectilinear portions from information representing intercepts of the plurality of rectilinear portions; and minimum value calculation means for determining the minimum spacing among the spacings calculated by the spacing calculation means and for outputting it as representative of the width of an object to be recognized in the original image.

6. An image information recognition system for inspecting, recognizing or judging an object using an image thereof, comprising:

mean value calculation means for calculating a mean value M of all picture element values from input digital image data;

modified Hough transformation means for applying a Hough transformation $$\rho = x \cos \theta + y \sin \theta$$

to each picture element (its coordinates (x, y)) of the original image and for effecting a polling in the θ-ρ parameter space with a weight equal to the difference |t(x, y)−M| between the picture element value t and the mean value M calculated by the mean value calculation means;

binarization processor means for processing the modified Hough transformed image from the modified Hough transformation means by use of a threshold to provide binarization image data comprising active picture elements and inactive picture elements;

labeling processor means for grouping adjacent picture elements in the binarization image obtained by the second binarization processor means;

representative point calculation means for determining the coordinates of a representative point of each group of adjacent picture elements grouped by the labeling processor means;

linear component estimation means for determining a linear equation for a rectilinear portion in the edge component in the original image from the coordinate information of respective representative points found by the representative point calculation means;

spacing calculation means operative when there are a plurality of rectilinear portions oriented in the same direction as determined by the linear component estimation means to calculate a spacing between adjacent rectilinear portions from information representing intercepts of the plurality of rectilinear portions; and minimum value calculation means for determining the minimum spacing among the spacings calculated by the spacing calculation means and for outputting it as representative of the width of an object to be recognized in the original image.

7. An image information recognition system according to one of claims 4 to 6, wherein the minimum value calculation means is replaced by equal spacing decision means which determines the minimum spacing among a plurality of rectilinear portions having the same inclination, compares it with the remaining spacings, and in the event the same spacing occurs at a plurality of occurrences, that spacing is outputted as representative of the width of equally spaced linear components throughout the entire image.

8. An image information recognition system according to one of claims 4 to 6, wherein the minimum value calculation means is replaced by equal spacing decision means which determines the minimum spacing among a plurality of rectilinear portions having the same inclination, compares it with the remaining spacings, in the event the same spacing does not occur at a plurality of locations, determines a second minimum spacing for comparison with the remaining spacings, repeating such procedure until the same spacing occurs at a plurality of locations, whereupon that spacing is outputted as representative of the width of equally spaced linear components throughout the entire image, and in the event the same spacing does not occur at a plurality of locations, outputs the minimum spacing which is initially determined as representing the width of the object to be recognized.

9. An image information recognition method for inspecting, recognizing or judging an object using an image thereof, comprising the steps of:

detecting an edge component from input digital image data;

applying a first threshold operation to the image obtained by the detection of the edge component to provide a binarization image data comprising active picture elements and inactive picture elements;

applying a Hough transformation to the binarization image obtained as a result of the first threshold operation;

applying a second threshold operation to the Hough transformed image to provide binarization image data comprising active picture elements and inactive picture elements;

grouping adjacent picture elements in the binarization image obtained by the second threshold operation;

determining the coordinates of a representative point of each group of adjacent picture elements each of which have been grouped; and determining a linear equation for a rectilinear portion of the edge component in the original image from coordinate information of respective representative points found.

10. An image information recognition method for inspecting, recognizing or judging an object using an image thereof, comprising the steps of:

calculating a mean value M of all picture element values from input digital image data, and subtracting the mean value M from the picture element value of each of the picture elements in the original image data to produce a difference image data;

applying a first threshold operation to the difference image data to provide binarization image data comprising active picture elements and inactive picture elements;

applying a Hough transformation to the binarization image obtained by the first threshold operation;

applying a second threshold operation to the Hough transformed image to provide binarization image data comprising active picture elements and inactive picture elements;

grouping adjacent picture elements in the binarization image obtained by the second threshold operation;

determining the coordinates of a representative point of each group of adjacent picture elements each of which have been grouped; and determining a linear equation for a rectilinear portion of the edge component in the original image from coordinate information of respective representative points found.

11. An image information recognition method for inspecting, recognizing or judging an object using an image thereof, comprising the steps of:

calculating a mean value M of all picture element values from input digital image data;

applying a Hough transformation $$\rho = x\cos\theta + y\sin\theta$$

to each picture element (its coordinates (x, y)) of the original image and effecting a polling in the $\theta$-$\rho$ parameter space with a weight equal to the difference $|t(x, y)-M|$ between the picture element value t and the calculated mean value M;

applying a threshold operation to the image obtained by the polling to provide binarization image data comprising active picture elements and inactive picture elements;

grouping adjacent picture elements in the binarization image obtained by the second threshold operation;

determining the coordinates of a representative point of each group of adjacent picture elements each of which have been grouped; and determining a linear equation for a rectilinear portion of the edge component in the original image from coordinate information of respective representative points found.

12. An image information recognition method for inspecting, recognizing or judging an object using an image thereof, comprising the steps of:

detecting an edge component from input digital image data;

applying a first threshold operation to the image obtained by the detection of the edge component to provide a binarization image data comprising active picture elements and inactive picture elements;

applying a Hough transformation to the binarization image obtained as a result of the first threshold operation;

applying a second threshold operation to the Hough transformed image to provide binarization image data comprising active picture elements and inactive picture elements;

grouping adjacent picture elements in the binarization image obtained by the second threshold operation;

determining the coordinates of a representative point of each group of adjacent picture elements each of which have been grouped;

determining a linear equation for a rectilinear portion of the edge component in the original image from coordinate information of respective representative points found;

in the event there are a plurality of rectilinear portions oriented in the same direction, calculating a spacing between adjacent rectilinear portions from information representing intercepts of the plurality of rectilinear portions; and determining the minimum spacing among the calculated spacings and determining it as representative of the width of the object to be recognized in the original image.

13. An image information recognition method for inspecting, recognizing or judging an object using an image thereof, comprising the steps of:

calculating a mean value M of all picture element values from input digital image data, and subtracting the mean value M from the picture element value of each of the picture elements in the original image data to produce a difference image data;

applying a first threshold operation to the difference image data to provide binarization image data comprising active picture elements and inactive picture elements;

applying a Hough transformation to the binarization image obtained by the first threshold operation;

applying a second threshold operation to the Hough transformed image to provide binarization image data comprising active picture elements and inactive picture elements;

grouping adjacent picture elements in the binarization image obtained by the second threshold operation;

determining the coordinates of a representative point of each group of adjacent picture elements each of which have been grouped;

determining a linear equation for a rectilinear portion of the edge component in the original image from coordinate information of respective representative points found;

in the event there are a plurality of rectilinear portions oriented in the same direction, calculating a spacing between adjacent rectilinear portions from information representing intercepts of the plurality of rectilinear portions; and determining the minimum spacing among the calculated spacings and determining it as representative of the width of the object to be recognized in the original image.

14. An image information recognition method for inspecting, recognizing or judging an object using an image thereof, comprising the steps of:

calculating a mean value M of all picture element values from input digital image data;

applying a Hough transformation $$\rho = x\cos\theta + y\sin\theta$$

to each picture element (its coordinates (x, y)) of the original image and effecting a polling in the $\theta$-$\rho$ parameter space with a weight equal to the difference $|t(x, y)-M|$ between the picture element value t and the calculated mean value M;

applying a threshold operation to the image obtained by the polling to provide binarization image data comprising active picture elements and inactive picture elements;

grouping adjacent picture elements in the binarization image obtained by the second threshold operation together;

determining the coordinates of a representative point of each of a plurality of labels each of which has been grouped;

determining a linear equation for a rectilinear portion of the edge component in the original image from coordinate information of respective representative points found;

in the event there are a plurality of rectilinear portions oriented in the same direction, calculating a spacing between adjacent rectilinear portions from information representing intercepts of the plurality of rectilinear portions; and determining the minimum spacing among the calculated spacings and determining it as representative of the width of the object to be recognized in the original image.

15. An image information recognition method according to one of claims 12 to 14, wherein instead of the step of determining the minimum value spacing among the calculated spacings and determining it to be representative of the width of the object to be recognized in the original image, is used the step of comparing the minimum spacing among a plurality of rectilinear portions having the same inclination with the remaining spacings, and if the same spacing occurs at a plurality of locations, determining that spacing to be representative of the width between two adjacent linear components in equally spaced linear components throughout the entire image.

16. An image information recognition method according to one of claims 12 to 14, wherein instead of the step of determining the minimum spacing among the calculated spacings and determining it to be representative of the width of the object to be recognized in the original image, is used the step of comparing the minimum spacing among a plurality of rectilinear portions having the same inclinations with the remaining spacings, in the event the same spacing does not occur at a plurality of locations, determining a second minimum spacing and comparing with the remaining spacings, and repeating such procedure until the same spacing occurs at a plurality of locations, whereupon such spacing is outputted as representative of the width between two adjacent linear components in equally spaced linear components throughout the entire image, and in the event the same spacing does not occur at a plurality of locations ultimately, determining the minimum spacing which was initially determined to be representative of the width of the object to be recognized.

* * * * *